United States Patent
Knoppert et al.

(10) Patent No.: US 11,816,263 B1
(45) Date of Patent: Nov. 14, 2023

(54) METHOD AND APPARATUS FOR SECURING A HANDHELD CONTROLLER TO A USER'S HAND

(71) Applicant: Dell Products, LP, Round Rock, TX (US)

(72) Inventors: Michiel Sebastiaan Emanuel Petrus Knoppert, Amsterdam (NL); Thomas Marcus Hinskens, Utrecht (NL); Loo Shing Tan, Singapore (SG); Gerald Rene Pelissier, Mendham, NJ (US); Martin Douglas Sawtell, Singapore (SG)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 17/731,974

(22) Filed: Apr. 28, 2022

(51) Int. Cl.
| | |
|---|---|
| *G06F 3/01* | (2006.01) |
| *G06V 40/13* | (2022.01) |
| *G06F 3/0346* | (2013.01) |
| *G06F 3/038* | (2013.01) |
| *A63F 13/24* | (2014.01) |

(52) U.S. Cl.
CPC ............ *G06F 3/014* (2013.01); *G06F 3/038* (2013.01); *G06F 3/0346* (2013.01); *G06V 40/13* (2022.01); *A63F 13/24* (2014.09); *A63F 2300/1043* (2013.01)

(58) Field of Classification Search
CPC ........ G06F 3/014; G06F 3/0346; G06F 3/038; G06V 40/13; A63F 13/24; A63F 2300/1043
See application file for complete search history.

(56) References Cited

U.S. PATENT DOCUMENTS

| | | | |
|---|---|---|---|
| 2021/0333562 A1* | 10/2021 | Chae ..................... | G06F 3/014 |
| 2022/0121237 A1* | 4/2022 | VanBlon .................. | G06T 7/60 |

* cited by examiner

*Primary Examiner* — Jonathan A Boyd
(74) *Attorney, Agent, or Firm* — Prol Intellectual Property Law, PLLC; H. Kenneth Prol

(57) ABSTRACT

A handheld controller to operate with a head-mounted display (HMD) and information handling system may include a data storage device; the HMD having an HMD processor and an HMD display device to present to a user an extended reality extended reality image of an environment; and the handheld controller, including: a handheld controller processor executing code instructions of a strap fit adjustment system to activate a strap tensioner mechanism to tighten a strap across a user's hand until a tightness threshold level has been achieved; a strap tightness measurement system to measure a tightness level of the strap across a user's hand as the strap tensioner mechanism tightens the strap across the user's hand; and the tightness level of the strap being set to the tightness threshold level by the user and accessible at a data storage device.

20 Claims, 13 Drawing Sheets

METHOD AND APPARATUS FOR SECURING A HANDHELD CONTROLLER TO A USER'S HAND

FIELD OF THE DISCLOSURE

The present disclosure generally relates to extended reality environments provisioned and displayed by, for example, a head-mounted display. The present disclosure more specifically relates to systems and methods of using a handheld controller associated with the head-mounted display to interact with extended reality environments.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling needs and requirements vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. Further, the information handling system may be operatively coupled to a virtual reality device such as a head-mounted display that allows a user to view an extended reality environment via HMD display device and lenses proximate to a user's eyes.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
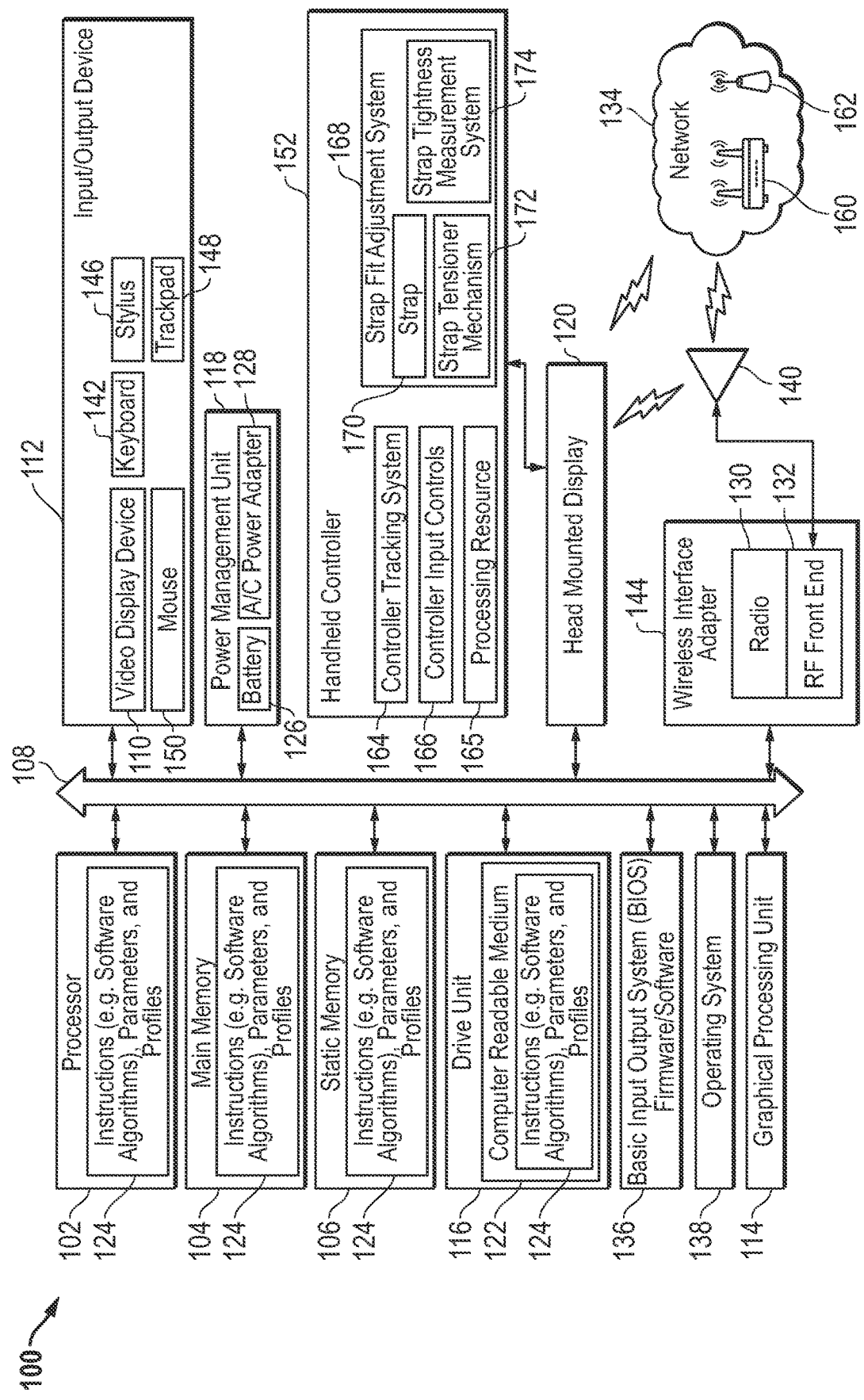
FIG. 1 is a block diagram illustrating an information handling system with a head-mounted display according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Head-mounted displays (HMDs) may be wearable around the user's eyes and/or head and have the capability of providing displayed or projected images to a user via an HMD display device or devices with lens adjustment proximate to the user's eyes. In an example, a user may be provided with a complete virtual reality (VR) environment while using the HMD device. In another example, HMD devices may allow the user to see through those displayed or projected images to the physical environment or view a presented image of the physical environment in, for example, augmented reality (AR) or mixed reality (MR). Indeed, HMDs may be capable of generating any type of extended reality that includes AR, VR, MR, or any other type of extended reality provided by the head-mounted display and contemplated to exist along a reality-virtuality continuum.

During operation of the HMD, a user may engage with any type application being executed on the HMD or on behalf of the HMD. In an embodiment, the HMD may be operatively coupled to an information handling system that processes data, at least in part, so that the extended reality images and an extended reality environment may be presented to the user via the HMD. This may be done by operatively coupling the HMD to the information handling system using a wire or wirelessly. In other embodiments, the HMD may include its own processing device (e.g., CPU, GPU, microcontroller, etc.) to generate the images presented to the user on the display device of the HMD.

As the user engages in the extended reality environments presented by the HMD, the user may implement one or more handheld controllers to engage with the extended reality environment presented. These handheld controllers may include one or more buttons, one or more triggers, and one or more joysticks, and motion sensors to detect controller motion among other inputs that allow the interaction by the user with the extended reality environment. During use, the user may not be capable of holding the handheld controllers for a significant amount of time or may accidentally drop or throw the controllers during use such as motion or gestures during gaming. To avoid this, the handheld controllers may include a strap to secure the handheld controllers to the user's hand according to an embodiment.

In an embodiment, the handheld controller includes a strap fit adjustment system to activate a strap tensioner mechanism within the handheld controller. The strap tensioner mechanism, when activated, may tighten a strap across a user's hand until a pre-set, learned, or selected tightness level has been achieved. This pre-set, learned, or user-selected tightness level may be referred to as a tightness threshold level for purpose of control of the tensioner and tightness of a retaining strap of the handheld controller. In an embodiment, the current tightness level may be measured using a solid-state strap tightness measurement system such as a strain gauge or force sensor as the strap tensioner mechanism increases the tightness of the strap. The tightness threshold level reached may be based on a variety of individual or groupings of factors. Among these factors may be a user tightness setting (e.g., user-defined tightness threshold level), a class or category of application being executed while the user implements the handheld controllers, the duration of use of the handheld controllers by the user, a grip force detected by a grip sensor, measurements from one or more sensors such as an accelerometer, limits on tightness set for user comfort or safety, among other factors. Each of these factors may be set as data points used as input into a tightness level machine learning algorithm in an embodiment that provides, as output, a target tightness threshold level for one or more different users. In other embodiments, a rule-based tightness table or system may be used to set to a threshold for the tightness or setting level generated by the strap tensioner mechanism.

In an embodiment, the user of the handheld controller may be identified using a fingerprint sensor. This fingerprint sensor may detect a user's fingerprint and identify the user via a fingerprint look-up table. The fingerprint look-up table may be maintained on the HMD itself or may be maintained on an information handling system operatively coupled to the HMD. In an embodiment, an application mode system may be used to determine that one or more particular applications or application category is being executed on the HMD. Upon execution of the application mode system, the processing device of the HMD or the information handling system operatively coupled thereto may provide data indicative of how to adjust the tightness level of the strap across the user's based on use characteristics of the handheld controller by the user during execution of that application.

In an embodiment a haptic feedback system may be implemented in the strap. This haptic feedback system may receive input from an application mode system to determine that an application is being executed and apply haptic feedback input to the strap fit adjustment system. The strap fit adjustment system may then selectively tighten and loosen the strap based on the haptic feedback input in order to present to the user this haptic feedback at the user's hand.

FIG. 1 illustrates an information handling system 100 similar to information handling systems according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a convertible laptop, a tablet, a smartphone, a desktop computer, a communications device, an access point (AP), a base station transceiver, a wireless telephone, a land-line telephone, a control system, a camera, a scanner, a facsimile machine, a printer, a personal trusted device, a web appliance, or any other suitable machine capable of executing a set of instructions (sequential or otherwise) that specify actions to be taken by that machine, and can vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the computer system 100 can be implemented using electronic devices that provide voice, video or data communication. For example, an information handling system 100 may be any mobile or other computing device capable of executing a set of instructions (sequential or otherwise) that specify actions to be taken by that machine. In an embodiment, the information handling system 100 may be operatively coupled to a server or other network device as well as with a head-mounted display 120 and provide data storage resources, processing resources, and/or communication resources to the head-mounted display 120 as described herein. Further, while a single information handling system 100 is illustrated, the term "system" shall also be taken to include any collection of systems or sub-systems that individually or jointly execute a set, or multiple sets, of instructions to perform one or more computer functions.

The information handling system can include memory (volatile (e.g., random-access memory, etc.), nonvolatile (read-only memory, flash memory etc.) or any combination thereof), one or more processing resources, such as the processor 102, a central processing unit (CPU), a graphics processing unit (GPU) 114, accelerated processing unit (APU), a microprocessor, a microcontroller, a digital signal processor (DSP), a vision processing unit (VPU), an application specific integrated circuit (ASIC), a reduced instruction set computer (RISC), a complex instruction set computer (CISC), a super scalar processor, or any combination thereof. Any of the processing resources may operate to execute code that is either firmware or software code. Additional components of the information handling system 100 can include one or more storage devices such as a main memory 104, static memory 106, computer readable medium 122 storing instructions 124 of one or more software or firmware applications, and drive unit 116 (volatile (e.g., random-access memory, etc.), nonvolatile (read-only memory, flash memory etc.) or any combination thereof). In an embodiment, the information handling system 100 may include one or more communications ports for communicating with external devices, as well as, various input and output (I/O) devices 112. The information handling system 100 can also include one or more buses 108 operable to transmit data communications between the various hardware components described herein. Portions of an information handling system 100 may themselves be considered information handling systems and some or all of which may be wireless.

Information handling system 100 can include devices or modules that embody one or more of the devices or execute instructions for the one or more systems and modules described above, and operates to perform one or more of the methods described above. The information handling system 100 may execute code instructions 124 via one or more processing resources that may operate on servers or systems, remote data centers, or on-box in individual client information handling systems according to various embodiments herein. In some embodiments, it is understood any or all portions of code instructions 124 may operate on a plurality of information handling systems 100.

As shown, the information handling system 100 may further include a video display device 110. The video display device 110 in an embodiment may function as a liquid crystal display (LCD), an organic light emitting diode (OLED), a flat panel display, or a solid-state display. Additionally, the information handling system 100 may include one or more input/output devices 112 including an alpha numeric input device such as a keyboard 142 and/or a cursor control device, such as a mouse 150, touchpad/trackpad 148, a stylus 146, a handheld controller 152, or a gesture or touch screen input device associated with the video display device 110. In an embodiment, the video display device 110 may provide output to a user remote from the user of the head-mounted display 120 to, for example, provide real-time training along with the visual training elements provided to the user at the head-mounted display 120. In an embodiment, the information handling system 100 may be used by a user, remote from the head-mounted display 120, with the resources of the information handling system 100 providing processing resources, data storage resources, a communication linking the head-mounted display (HMD) 120 to a server network, among other functionalities. In another embodiment, the information handling system 100 may be local to the user operating the HMD 120 with the information handling system 100 operatively coupled to a network 134 via a wireless interface adapter 144.

The network interface device shown as wireless interface adapter 144 can provide connectivity to a network 134, e.g., a wide area network (WAN), a local area network (LAN), wireless local area network (WLAN), a wireless personal area network (WPAN), a wireless wide area network (WWAN), or other network. In an embodiment, the WAN, WWAN, LAN, and WLAN may each include an access point 160 or base station 162 used to operatively coupled the information handling system 100 to a network 134. In a specific embodiment, the network 134 may include macro-cellular connections via one or more base stations 162 or a wireless access point 160 (e.g., Wi-Fi), or such as through licensed or unlicensed WWAN small cell base stations 162. Connectivity may be via wired or wireless connection. For example, wireless network access points 160 or base stations 162 may be operatively connected to the information handling system 100 and the HMD 120. The wireless interface adapter 144 may include one or more radio frequency (RF) subsystems (e.g., radio 130) with transmitter/receiver circuitry, modem circuitry, one or more antenna front end circuits 132, one or more wireless controller circuits, amplifiers, antennas 140 and other circuitry of the radio 130 such as one or more antenna ports used for wireless communications via multiple radio access technologies (RATs). The radio 130 may communicate with one or more wireless technology protocols. In and embodiment, the radio 130 may contain individual subscriber identity module (SIM) profiles for each technology service provider and their available protocols for any operating subscriber-based radio access technologies such as cellular LTE communications.

In an example embodiment, the wireless interface adapter 144, radio 130, and antenna 140 may provide connectivity to a one or more of the peripheral devices that may include a wireless video display device 110, a wireless keyboard 142, a wireless mouse 150, a wireless headset such as the HMD 120 and/or a microphone and speaker headset, a wireless stylus 146, and a wireless trackpad 148 among other wireless peripheral devices used as input/output (I/O) devices 112 including any controller associate with the HMD 120. In an embodiment, the HMD 120 may include a wireless radio and an antenna to wirelessly couple the HMD 120 to the information handling system 100 via the antenna 140 and radio 130. In an embodiment, the HMD 120 may operate with Bluetooth radio protocols. In other embodiments, the HMD 120 may operate with Wi-Fi 802.11 radio protocol, 5G NR radio protocols, or other wireless protocols to operatively couple the HMD 120 to the network 134 without the information handling system 100 being accessed by the HMD 120. In an embodiment, an antenna controller operatively coupled to an operating system (OS) 138 may concurrently transceive data to and from the HMD 120. This processing device may be a processing device on the information handling system 100, at the HMD 120, or a combination of processors on these devices.

As described, the wireless interface adapter 144 may include any number of antennas 140 which may include any number of tunable antennas for use with the system and methods disclosed herein. Although FIG. 1 shows a single antenna 140, the present specification contemplates that the number of antennas 140 may include more or less of the number of individual antennas shown in FIG. 1. Additional antenna system modification circuitry (not shown) may also be included with the wireless interface adapter 144 to implement coexistence control measures via an antenna controller as described in various embodiments of the present disclosure.

The wireless interface adapter 144 can represent an add-in card, wireless network interface module that is integrated with a main board of the information handling system or integrated with another wireless network interface capability, or any combination thereof. In an embodiment the wireless interface adapter 144 may include one or more radio frequency subsystems including transmitters and wireless controllers for connecting via a multitude of wireless links. In an example embodiment, an information handling system 100 may have an antenna system transmitter for 5G small cell WWAN, Wi-Fi WLAN connectivity and one or more additional antenna system transmitters for macrocellular communication. The RF subsystems and radios 130 include wireless controllers to manage authentication, connectivity, communications, power levels for transmission, buffering, error correction, baseband processing, and other functions of the wireless interface adapter 144.

In an embodiment, the HMD 120 may include its own wireless interface adapter, radio, antenna front end, and antenna. This may allow the HMD 120 to communicate with the information handling system 100 or, alternatively, directly to a network housing a remote server or other computing device. As such, this wireless interface adapter, radio, antenna front end, and antenna may allow the HMD 120 to operate independent of the information handling system 100 if necessary. With the wireless interface adapter, radio, antenna front end, and antenna of the HMD 120, the HMD 120 may communicate with the information handling system 100 or the network 134 via an out-of-band (OOB) communication channel. The OOB communication may initially facilitate the communication of the HMD 120 with the information handling system 100 or some external sensors via, for example, Bluetooth or Wi-Fi communication protocols. In an embodiment, the OOB communication may also be accomplished using those wireless communication protocols described in connection with the operation of the wireless interface adapter 144.

During operation, the information handling system 100 may communicate with the HMD 120 either via a wired connection or wirelessly as described herein. The operation of the HMD 120 may not be dependent on the information handling system 100 being in operation, in an embodiment, and the HMD 120 may be used by the user whether the information handling system 100 is operatively coupled to the HMD 120 or not. In this embodiment, the HMD 120 may include the necessary hardware used to, in an embodiment, display an extended reality image of a surrounding environment. This hardware used may vary depending on the type of process used to display the extended reality image to the user. Example process may be grouped into two general categories: inside-out positional tracking processes and outside-in tracking processes. Although, the present specification contemplates the use of outside-in tracking processes, for convenience in description, the present specification may refer to an HMD 120 the operates using an inside-out process of tracking the HMD 120. With the inside-out process of tracking the HMD 120, the HMD 120 includes a camera and other sensors used to location the HMD 120 as it moves within an environment, in an embodiment. In an embodiment, the HMD 120 may include positional sensors such as a global positioning system (GPS) unit, an inertial measurement unit (IMU), an e-Compass unit, and/or other positional measurement tools such as an accelerometer, a capacitive transducer, a hall effect sensor, a laser doppler vibrometer, a multi-axis displacement transducer, a potentiometer, or a confocal chromatic sensor. Other positional sensors are also contemplated, including a capacitive displacement sensor, an eddy-current sensor, an ultrasonic sensor, a grating sensor, an inductive non-contact position sensor, a linear variable differential transformer, a photodiode array, a piezo-electric transducer, a proximity sensor, a rotary encoder, a seismic displacement pick-up, and a string potentiometer, along with any other positional sensors developed in the future. The positional sensors (e.g., GPS unit, IMU, and/or eCompass unit) in an embodiment may operate to measure location coordinates (x, y, z) of the HMD 120, as well as orientation ($\theta$), velocity, and/or acceleration. Velocity, acceleration, and trajectory of the HMD 120 in such an embodiment may be determined by comparing a plurality of measured location coordinates and orientations taken over a known period, or may be measured directly by onboard positional sensor such as an accelerometer. Additionally, or alternatively, Wi-Fi triangulation may be used that uses the characteristics of nearby Wi-Fi hotspots and other wireless access points to discover where within an environment the HMD 120 is located. Additionally, or alternatively, an Internet-of-Things (IoT) device may include sensors that may be detectable by the HMD 120 and provides data to the HMD 120 that it is within an environment. In an embodiment, a simultaneous localization and mapping (SLAM) engine executing a SLAM process, the IoT devices, and the Wi-Fi hotspot triangulation process may all be used as data inputs to the head-mounted display CPU/GPU or the processor 102 to better determine the initial configuration and location of the HMD 120. In an embodiment, the OOB communication channel may help to communication wirelessly with some of these sensors when determining the location of the HMD 120. In an embodiment, the HMD 120 may include an embedded controller that operates this OOB communication link so that this communication may be conducted below the operating system of the HMD 120. This prevents the head-mounted display CPU/GPU from having to receive and compute this data leaving the head-mounted display CPU/GPU to conduct, for example, the SLAM computations described herein.

The HMD 120 may also be capable of capturing video or still images of its surrounding environment, which may include one or more identifiable landmarks. For example, the HMD 120 may include one or more cameras. These cameras may capture two-dimensional images of the surrounding environment, which may be combined with distance measurements gathered by a plurality of, for example, IR emitters and detectors to generate a three-dimensional image of the surrounding environment such as from the handheld controller 152 described herein. The cameras, in an embodiment, may be, for example, a stereo triangulation camera, an Infrared (IR) camera, a sheet of light triangulation camera, a structured light camera, a time-of-flight camera, an interferometry camera, a coded aperture camera, a RGB digital camera, an infrared digital camera, a telephoto lens digital camera, a fish-eye digital camera, a wide-angle digital camera, a close-focus digital camera, or any other type of camera. The three-dimensional image generated by a processing device (e.g., a processing device in the HMD 120 or processor 102 and the like) in an embodiment may be used to determine the position and orientation of the HMD 120 with respect to the one or more landmarks.

In an embodiment, a processing device either on the HMD 120 itself or the processor 102 in operative communication with the HMD 120 may process this received data from these sensors and the camera in order to facilitate the presentation of an extended reality image of a surrounding environment to a user. These images are projected to the user via a display device on the HMD 120 as described herein. This may be done using, for example a simultaneous localization and mapping (SLAM) process. The SLAM process, in an embodiment, may be employed in order to identify the position of the headset with respect to its surrounding environment, model the surrounding environment as viewed from the perspective of the headset wearer, and render the modeled image in a three-dimensional environment matching the surrounding real-world environment. It does this by a processing device (e.g., processor 102 or a processor operatively coupled to the HMD 120) executing computer readable program code describing an algorithm that concurrently maps an environment the HMD 120 is within and detects the position of the HMD 120 within that environment. IR emitters and sensors housed within or mounted on the exterior surfaces of the HMD 120 may measure such distances in an embodiment. IR emitters and sensors may be mounted in all directions around the exterior surface of the HMD 120, in some embodiments. In other embodiments, only portions of the exterior surfaces of the wearable headsets may have infrared emitters and sensors or cameras. For example, the HMD 120 may emit IR light in a pattern toward the physical landmark, the HMD 120 may emit IR light, and the HMD 120 may emit IR light toward the physical landmark. The cameras mounted to the HMD 120 may then capture an image of each of the IR lights reflecting off the surfaces of the physical landmark. If the surrounding environment further includes other ambient light sources, the cameras will also detect illumination from the physical landmark reflecting such ambient light. For example, if desk lamp and/or floor lamp are turned on, the physical landmark in an embodiment may reflect ambient light generated by the lamps.

The depth of surfaces of nearby objects may be determined by analyzing the way in which the pattern of emitted IR light is distorted as it reaches surfaces of varying distances from the HMD 120. For example, the HMD 120 may determine the depth of the physical landmark by analyzing the way in which the pattern of emitted IR light is distorted as it reaches the surfaces of physical landmark. Similarly, the HMD 120 may determine the depth of the physical landmark by analyzing the way in which the pattern of emitted IR light is distorted as it reaches the surfaces of physical landmark, and the HMD 120 may determine the depth of the physical landmark by analyzing the way in which the pattern of emitted IR light is distorted as it reaches the surfaces of physical landmark. With this data and the other data from the other sensors described herein, the processing device may execute the algorithm defining the SLAM process in order to render to a user via the display device of the HMD 120 an extended reality image based on a rendered image from the model generated.

As described herein, the HMD 120 may have one or more handheld controllers 152 as input/output devices 112 associated with it or the information handling system 100. A handheld controller 152 may be used by a user to manipulate and interact with those extended reality environments presented to the user via the display device of the HMD 120. As described herein, the handheld controller 152 may include a controller tracking system 164. The controller tracking system 164 provides information the to the HMD 120 related to the position of the handheld controller 152 relative to the HMD 120 or generally within an environment. In an embodiment, this controller tracking system 164 may include one or more IR emitters that emit an IR light towards the cameras of the HMD 120. The detected IR light from these IR emitters on the handheld controller 152 may be analyzed to determine the position of the handheld controller 152. In an embodiment, a real-world view, or a virtual representation of the position of the handheld controller 152 may be presented to the user at the HMD 120 when using the HMD 120 based on the positional data associated with the handheld controller 152.

In an embodiment, the handheld controller 152 may include one or more controller input controls 166. The controller input controls 166 may include one or more buttons, triggers, or joysticks, for example, that allow a user to provide input to the HMD 120 to affect the extend reality presented to the user. The placement of these controller input controls 166 may be dictated by the convenience of those controller input controls 166 for the user to access while holding the handheld controller 152. In an embodiment, the controller input controls 166 may include a joystick, trigger, or button that includes a fingerprint reader. As described herein, the fingerprint reader may help to identify the user of the handheld controller 152 and adjust the length of a strap 170 on the handheld controller 152 via a strap fit adjustment system 168 according to embodiments herein.

As described herein, the handheld controller 152 may further include the strap fit adjustment system 168 as software or firmware code instructions executed by a controller chip or other processing resource 165 such as an ASIC or other hardware control logic on the handheld controller 152. In order to prevent damage or loss of the handheld controller 152, the handheld controller 152 includes a strap 170 that holds the handheld controller 152 to the user's hand. This strap may be automatically adjusted according via execution of instructions by the processing resource 165 of the strap fit adjustment system 168. In order to accomplish this, the strap fit adjustment system 168 includes a strap tightness measurement system 174 and a strap tensioner mechanism 172. The strap tensioner mechanism 172 may include one or more devices that tightens the strap 170 across a user's hand until a tightness level have been achieved such as a mechanized spool, rachet, or rack and pinion system. In an embodiment, the strap tightness measurement system 174 may include an electrical or mechanical pressure sensor, torque sensor, or strain gauge that measures that tightness of the strap 170 across the user's hand at any given time. The strap tensioner mechanism 172 and the strap tightness measurement system 174 may come in many forms and will be described in more detail in the embodiments presented in the present disclosure.

The information handling system 100 can include a set of instructions 124 that can be executed to cause the computer system to perform any one or more of the methods or computer-based functions disclosed herein. For example, instructions 124 may execute a strap fit adjustment system 168, a strap tensioner mechanism 172, a strap tightness measurement system 174, various software applications, software agents, or other aspects or components such as the handheld controller 152 or hardware in the information handling system 100. Various software modules comprising application instructions 124 may be coordinated by an operating system (OS) 138, and/or via an application programming interface (API). An example OS 138 may include Windows®, Android®, and other OS types known in the art. Example APIs may include Win 32, Core Java API, or Android APIs.

The disk drive unit 116 and may include a computer-readable medium 122 in which one or more sets of instructions 124 such as software can be embedded to be executed by the processor 102 such as a CPU, or other processing resources such as processing resource 165 to perform the methods described herein. Similarly, main memory 104 and static memory 106 may also contain a computer-readable medium for storage of one or more sets of instructions, parameters, or profiles 124 described herein. The disk drive unit 116 or static memory 106 also contain space for data storage. Further, the instructions 124 may embody one or more of the methods or logic as described herein. In a particular embodiment, the instructions, parameters, and profiles 124 may reside completely, or at least partially, within the main memory 104, the static memory 106, and/or within the disk drive 116 during execution by the processor 102 or GPU 114 of information handling system 100 or processing resource 165 of the handheld controller 152. The main memory 104, static memory 106, or processing resources 102, GPU 114, or processing resources 165 also may include computer-readable media.

Main memory 104 or other memory of the embodiments described herein may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The computer executable program code describing the strap fit adjustment system 168 may be stored on the static memory 106, the drive unit 116, or on a local memory of the handheld controller 152 or HMD 120 and may include access to a computer-readable medium 122 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that can store, encoding, or carrying a set of instructions for execution by a processor or that cause a computer system to perform any one or more of the methods or operations disclosed herein.

In an embodiment, the information handling system 100 may further include a power management unit (PMU) 118 (a.k.a. a power supply unit (PSU)). The PMU 118 may manage the power provided to the components of the information handling system 100 such as the processor 102, a cooling system, one or more drive units 116, a graphical processing unit (GPU), a video/graphic display device 110 or other input/output devices 112 such as the stylus 146, and other components that may require power when a power button has been actuated by a user. In an embodiment, the PMU 118 may monitor power levels and be electrically coupled, either wired or wirelessly, to the information handling system 100 to provide this power and coupled to bus 108 to provide or receive data or instructions. The PMU 118 may be coupled to the antenna controller to control the wireless radio 130 of the information handling system 100 as described herein. The PMU 118 may regulate power from a power source such as a battery 126 or A/C power adapter 128. In an embodiment, the battery 126 may be charged via the A/C power adapter 128 and provide power to the components of the information handling system 100 via a wired connections as applicable, or when A/C power from the A/C power adapter 128 is removed. A similar PMU with a battery or A/C power source may be provided for the handheld controller 152 or HMD 120 in various embodiments described herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In various embodiments, dedicated hardware implementations such as application specific integrated circuits (ASICs), programmable logic arrays and other hardware devices can be constructed to implement one or more of the methods described herein and serve as processing resource 165 in the handheld controller 152 or in the HMD 120. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module can also include a combination of the foregoing examples of hardware or software. Note that an information handling system can include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
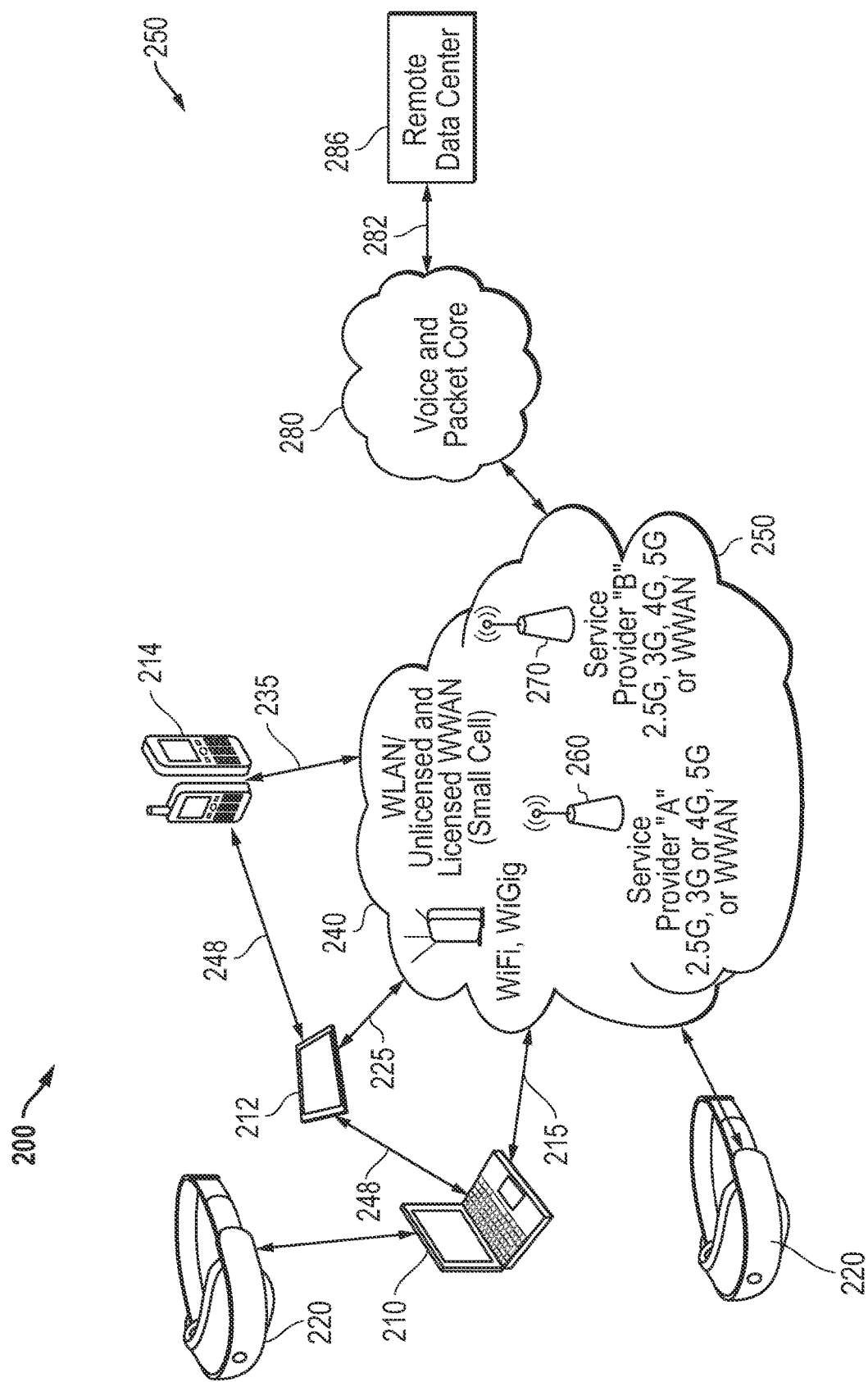
FIG. 2 is a block diagram of a network environment offering several communication protocol options and mobile information handling systems according to an embodiment of the present disclosure.

FIG. 2 illustrates a network 200 that can include one or more information handling systems 210, 212, 214. Additionally, one or more HMDs 220 may be operatively coupled, wired or wirelessly, to the network 200 either directly or indirectly via the one or more information handling systems 210, 212, 214. The information handling systems 210, 212, 214 and HMDs 220 shown in FIG. 2 may be similar to the information handling system 100 and HMDs 220 described in connection with FIG. 1, respectively. In a particular embodiment, network 200 includes networked mobile information handling systems 210, 212, 214, HMDs 220, wireless network access points, and multiple wireless connection link options. A variety of additional computing resources of network 200 may include client mobile information handling systems, data processing servers, network storage devices, local and wide area networks, or other resources as needed or desired. As partially depicted, information handling systems 210, 212, 214 may be a laptop computer, tablet computer, 360-degree convertible systems, wearable computing devices, or a smart phone device. These information handling systems 210, 212, 214, may access a wireless local network 240, or they may access a macro-cellular network 250. For example, the wireless local network 240 may be the wireless local area network (WLAN), a wireless personal area network (WPAN), or a wireless wide area network (WWAN). In an example embodiment, LTE-LAA WWAN may operate with a small-cell WWAN wireless access point option.

Since WPAN or Wi-Fi Direct connection 248 and WWAN networks can functionally operate similar to WLANs, they may be considered as wireless local area networks (WLANs) for purposes herein. Components of a WLAN may be connected by wireline or Ethernet connections to a wider external network such as a voice and packet core 280. For example, wireless network access points (e.g., 160 FIG. 1) or base stations (e.g., 162, FIG. 1) may be connected to a wireless network controller and an Ethernet switch. Wireless communications across wireless local network 240 may be via standard protocols such as IEEE 802.11 Wi-Fi, IEEE 802.11ad WiGig, IEEE 802.15 WPAN, IEEE 802.11ax-2021, (e.g., Wi-Fi 6 and 6E, 6 GHz technologies), or emerging 5G small cell WWAN communications such as gNodeB, eNodeB, or similar wireless network protocols and access points. Alternatively, other available wireless links within network 200 may include macro-cellular connections 250 via one or more service providers 260 and 270. As described herein, a plurality of antennas may be operatively coupled to any of the macro-cellular connections 250 via one or more service providers 260 and 270 or to the wireless local area networks (WLANs) selectively based on the SAR data, RSSI data, configuration data, system operation and connection metrics, peripheral telemetry data, and antenna mounting locations (e.g., spatial locations of antennas within the information handling system) associated with each information handling systems 210, 212, 214 as described herein. Service provider macro-cellular connections may include 2G standards such as GSM, 2.5G standards such as GSM EDGE and GPRS, 3G standards such as W-CDMA/UMTS and CDMA 2000, 4G standards, or emerging 5G standards including WiMAX, LTE, and LTE Advanced, LTE-LAA, small cell WWAN, and the like.

Wireless local network 240 and macro-cellular network 250 may include a variety of licensed, unlicensed or shared communication frequency bands as well as a variety of wireless protocol technologies ranging from those operating in macrocells, small cells, picocells, or femtocells. As described herein, utilization of RF communication bands according to several example embodiments of the present disclosure may include bands used with the WLAN standards and WWAN carriers which may operate in both licensed and unlicensed spectrums. For example, both WLAN and WWAN may use the Unlicensed National Information Infrastructure (U-NII) band which typically operates in the ~5 MHz frequency band such as 802.11 a/h/j/n/ac/ax (e.g., center frequencies between 5.170-7.125 GHz). WLAN, for example, may operate at a 2.4 GHz band, 5 GHz band, and/or a 6 GHz band according to, for example, Wi-Fi, Wi-Fi 6, or Wi-Fi 6E standards. WWAN may operate in a number of bands, some of which are proprietary but may include a wireless communication frequency band. For example, low-band 5G may operate at frequencies similar to 4G standards at 600-850 MHz. Mid-band 5G may operate at frequencies between 2.5 and 3.7 GHz. Additionally, high-band 5G frequencies may operate at 25 to 39 GHz and even higher. In additional examples, WWAN carrier licensed bands may operate at the new radio frequency range 1 (NRFR1), NFRF2, bands, and other known bands. Each of these frequencies used to communicate over the network 240, 250 may be based on the radio access network (RAN) standards that implement, for example, eNodeB or gNodeB hardware connected to mobile phone networks (e.g., cellular networks) used to communicate with the information handling systems 210, 212, 214 and HMDs 220. In the example embodiment, mobile one or more information handling systems 210, 212, 214 may also include both unlicensed wireless RF communication capabilities as well as licensed wireless RF communication capabilities. For example, licensed wireless RF communication capabilities may be available via a subscriber carrier wireless service operating the cellular networks. With the licensed wireless RF communication capability, an WWAN RF front end of the information handling systems 210, 212, 214 may operate on a licensed WWAN wireless radio with authorization for subscriber access to a wireless service provider on a carrier licensed frequency band. WLAN such as Wi-Fi (e.g., Wi-Fi 6) may be unlicensed.

In some embodiments, a networked mobile information handling system 210, 212, 214 and/or HMDs 220 may have a plurality of wireless network interface systems capable of transmitting simultaneously within a shared communication frequency band. That communication within a shared communication frequency band may be sourced from different protocols on parallel wireless network interface systems or from a single wireless network interface system capable of transmitting and receiving from multiple protocols. Similarly, a single antenna or the plurality of antennas in each information handling systems 210, 212, 214 or HMDs 220 may be used on each of the wireless communication devices such as according to embodiments herein and may be suited to plural RF bands. Example competing protocols may be local wireless network access protocols such as Wi-Fi/WLAN, WiGig, and small cell WWAN in an unlicensed, shared communication frequency band. Example communication frequency bands may include unlicensed 5 GHz frequency bands or 3.5 GHz conditional shared communication frequency bands under FCC Part 96. Wi-Fi ISM frequency bands may be subject to sharing include 2.4 GHz, 60 GHz, 900 MHz or similar bands as understood by those of skill in the art. Within local portion of wireless network 250 access points for Wi-Fi or WiGig as well as small cell WWAN connectivity may be available in emerging 5G technology. This may create situations where a plurality of antenna systems are operating on a mobile information handling system 210, 212, 214 via concurrent communication wireless links on both WLAN and WWAN radios and antenna systems. In some embodiments, concurrent wireless links may operate within the same, adjacent, or otherwise interfering communication frequency bands and may be required to utilize spaced antennas. The antenna may be a transmitting antenna that includes high-band, medium-band, low-band, and unlicensed band transmitting antennas in embodiments herein. The antenna may cooperate with other antennas in a N×N MIMO array configuration according to the embodiments described herein. Alternatively, embodiments may include a single transceiving antennas capable of receiving and transmitting, and/or more than one transceiving antennas. Each of the antennas included in the information handling systems 210, 212, 214 and/or HMDs 220 in an embodiment may be subject to the FCC regulations on specific absorption rate (SAR).

The voice and packet core network 280 shown in FIG. 2 may contain externally accessible computing resources and connect to a remote data center 286. The voice and packet core network 280 may contain multiple intermediate web servers or other locations with accessible data (not shown). The voice and packet core network 280 may also connect to other wireless networks similar to 240 or 250 and additional mobile information handling systems such as 210, 212, 214, HMDs 220, or similar connected to those additional wireless networks. Connection 282 between the wireless network 240 and remote data center 286 or connection to other additional wireless networks may be via Ethernet or another similar connection to the world-wide-web, a WAN, a LAN, another WLAN, or other network structure. Such a connection 282 may be made via a WLAN access point/Ethernet switch to the external network and be a backhaul connection. The access point may be connected to one or more wireless access points in the WLAN before connecting directly to a mobile information handling system or may connect directly to one or more information handling systems 210, 212, 214 and/or HMDs 220. Alternatively, mobile information handling systems 210, 212, 214 and or HMDs 220 may connect to the external network via base station locations at service providers such as 260 and 270. These service provider locations may be network connected via backhaul connectivity through the voice and packet core network 280.

Remote data centers 286 may include web servers or resources within a cloud environment that operate via the voice and packet core 280 or other wider internet connectivity. For example, remote data centers can include additional information handling systems, data processing servers, network storage devices, local and wide area networks, or other resources as needed or desired. Having such remote capabilities may permit fewer resources to be maintained at the mobile information handling systems 210, 212, 214 and HMDs 220 allowing streamlining and efficiency within those devices. In an embodiment, the remote information management system 288 may be part of a 5G multi-edge compute server placed at an edge location on the network 200 for access by the information handling systems 210, 212, 214 and/or HMDs 220. In an embodiment, the remote data center 286 permits fewer resources to be maintained in other parts of network 200. In an example embodiment, processing resources on the remote data center 286 may be requested from the HMDs 220 to engage in extended reality environments. Although an information handling system 210, 212, 214 may be used to process some of the data used to provide a VR, AR, and/or MR environment to the displays of the HMDs 220, the remote data center 286 may facilitate the remote information management system 288 to perform those tasks described herein.

Although communication links 215, 225, and 235 are shown connecting wireless adapters of information handling systems 210, 212, 214 to wireless networks 240 or 250, a variety of wireless links are contemplated. Wireless communication may link through a wireless access point (Wi-Fi or WiGig), through unlicensed WWAN small cell base stations such as in network 240 or through a service provider tower and base stations such as that shown with service provider A 260 or service provider B 270 and in network 250. In other aspects, mobile information handling systems 210, 212, 214 may communicate intra-device via intercommunication links 248 when one or more of the information handling systems 210, 212, 214 are set to act as an access point or even potentially an WWAN connection via small cell communication on licensed or unlicensed WWAN connections. For example, one of mobile information handling systems 210, 212, 214 may serve as a Wi-Fi hotspot in an embodiment. Concurrent wireless links to information handling systems 210, 212, 214 may be connected via any access points including other mobile information handling systems as illustrated in FIG. 2.

Figure 3:
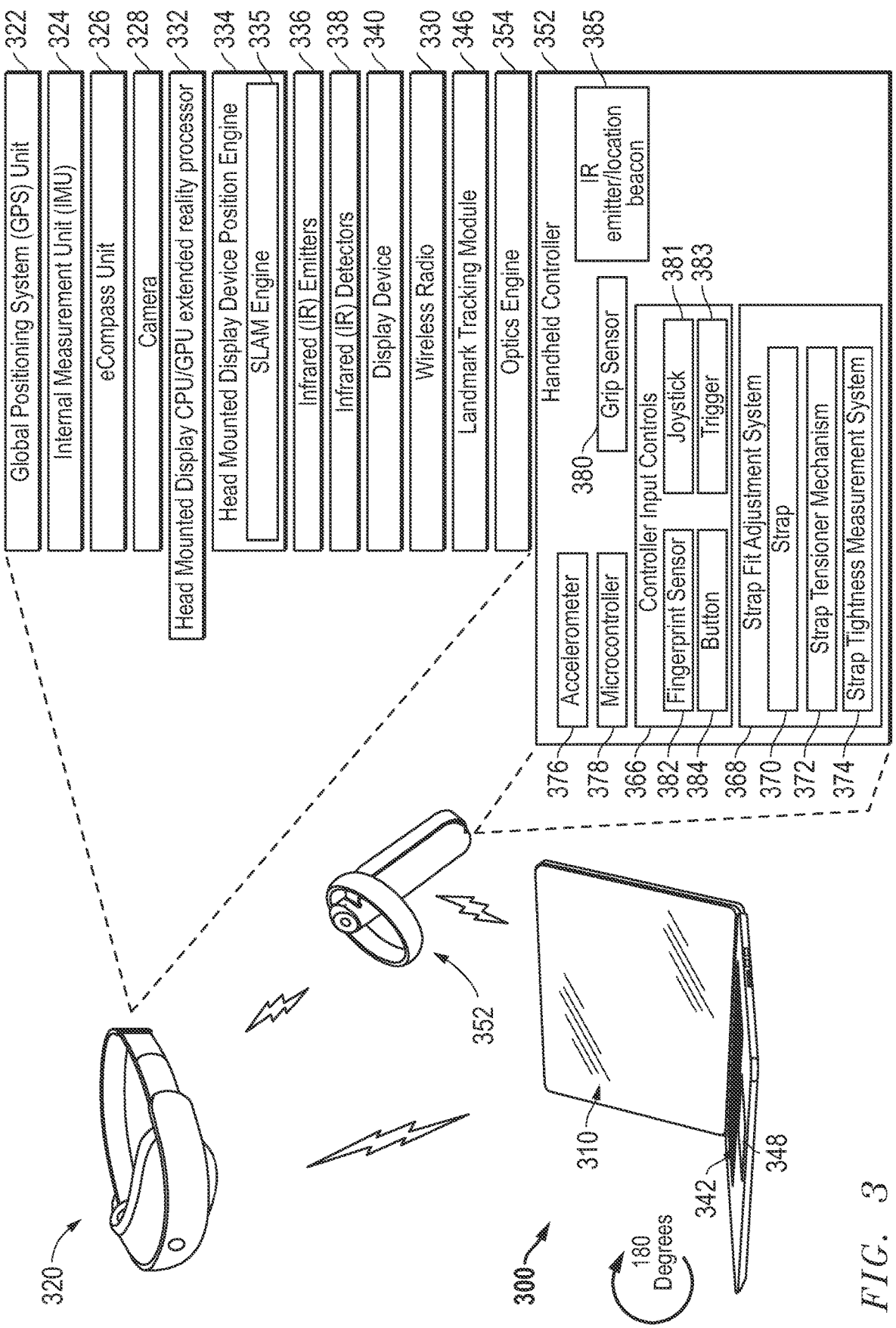
FIG. 3 is a block diagram illustrating a head-mounted display operatively coupled to an information handling system and a handheld controller according to an embodiment of the present disclosure.

FIG. 3 is a block diagram illustrating an HMD 320 and handheld controller 352 operatively coupled to an information handling system 300 or to one another according to an embodiment of the present disclosure. As described herein, the HMD 320 may be communicatively coupled to the information handling system 300 either via a wired or wireless connection. In an embodiment, the information handling system 300 may be remote to the user operating the HMD 320 or may be local with the information handling system 300 acting as an intermediary device to a remote server, data source, or other resource on a network as described herein. In an embodiment, the handheld controller 152 may be operatively coupled to the information handling system 300 or the HMD 320 via a wired connection. In this embodiment, the wired connection may be used to transmit data to and from the handheld controller 152 as well as provide power to the handheld controller 152. In another embodiment, the handheld controller 152 may be operatively coupled to the information handling system 300 or the HMD 320 via a wireless connection, such as a Bluetooth, 5G NR, Wi-Fi or other wireless coupling.

As partially depicted, information handling system 300 may be a laptop computer such as a 360-degree convertible system. The information handling system 300 may include a keyboard 342, a mouse (not shown), a video/graphic display 310, a stylus (not shown), and a trackpad 348 or any combination thereof. These input devices may be used to communicate with the HMD 320 and provide output to the user via, for example, a visual representation on the video/graphic display 310 of what the user sees when operating the HMD 320. In an embodiment, the HMD 320 may be used to interact, via an extended reality environment, with the graphical user interfaces presented on the video/graphic display 310 and generated via execution of one or more application programs at the information handling system 300.

As described herein, the head-mounted display 320 may include a power source and any number of sensors used to determine the position of the head-mounted display 320 within an environment by executing, with a processor, the head-mounted display positioning engine 334. For example, the head-mounted display 320 in an embodiment may include positional sensors such as a global positioning system (GPS) unit 322, an inertial measurement unit (IMU) 324, an e-Compass unit 326, and/or other positional measurement tools such as an accelerometer, a capacitive transducer, a hall effect sensor, a laser doppler vibrometer, a multi-axis displacement transducer, a potentiometer, or a confocal chromatic sensor, among others. Other positional sensors are also contemplated, including a capacitive displacement sensor, an eddy-current sensor, an ultrasonic sensor, a grating sensor, an inductive non-contact position sensor, a linear variable differential transformer, a photodiode array, a piezo-electric transducer, a proximity sensor, a rotary encoder, a seismic displacement pick-up, and a string potentiometer, along with any other positional sensors developed in the future. The positional sensors (e.g., GPS unit 322, IMU 324, and/or eCompass unit 326) in an embodiment may operate to measure location coordinates (x, y, z) of the HMD 320, as well as orientation (0), velocity, and/or acceleration. Velocity, acceleration, and trajectory of the HMD 320 in such an embodiment may be determined by comparing a plurality of measured location coordinates and orientations taken over a known period, or may be measured directly by onboard positional sensor such as an accelerometer.

The HMD 320 may also be capable of capturing video or still images of its surrounding environment, which may include one or more identifiable landmarks. For example, the HMD 320 may include a head-mounted display camera 328. The camera 328 may capture a two-dimensional image of the surrounding environment, which may be combined with distance measurements gathered by a plurality of IR emitters 336 and IR detectors 338 to generate a three-dimensional image of the surrounding environment. The camera 328 in an embodiment may be, for example, a stereo triangulation camera, an Infrared (IR) camera, a sheet of light triangulation camera, a structured light camera, a time-of-flight camera, an interferometry camera, a coded aperture camera, a RGB digital camera, an infrared digital camera, a telephoto lens digital camera, a fish-eye digital camera, a wide-angle digital camera, a close-focus digital camera, or any other type of camera. The three-dimensional image captured by a three-dimensional camera 328 in an embodiment may be used to determine the position and orientation of the HMD 320 with respect to the one or more landmarks viewable within the environment.

The HMD 320 in an embodiment may further include a head-mounted display CPU/GPU/extended reality processor 332 or other processing resource. The head-mounted display CPU/GPU/extended reality processor 332 or other processing resource may execute instructions to provide images to the user via the display device 340 of the HMDs 220. Such instructions executed by the head-mounted display CPU/GPU/extended reality processor 332 or other processing resource in an embodiment may include those instructions used to create the VR environment, the AR environment, and/or the MR environment by projecting images to the user whether those images are superimposed over real-world images captured by the camera 328 or not.

The head-mounted display CPU/GPU/extended reality processor 332 or other processing resource may also transmit an image of the surrounding environment captured by the camera 328 and the measured position (x, y, z), orientation (0), velocity, and/or acceleration of the HMD 320 to the wirelessly connected laptop or desktop information handling system 300 via a network adapter and a wireless radio 330, in an embodiment. The head-mounted display CPU/GPU/extended reality processor 332 or other processing resource may also execute a simultaneous localization and mapping (SLAM) engine to generate SLAM frames indicating the positions of the head-mounted display 320 and one or more identified landmarks in the surrounding environment from the remotely connected laptop or desktop information handling system 300 via the network adapter.

The head-mounted display CPU/GPU/extended reality processor 332 or other processing resource in an embodiment may determine the position/orientation of identified landmarks with respect to the HMD 320 through analysis of the positional information measured in the image captured by the camera 328 in combination with an identification by a landmark tracking module 346 of the one or more landmarks. Here the landmark tracking module 346 may be any executable program code that identifies these landmarks, tracks those landmarks, and provides special relation data of the HMD 320 relative to these landmarks, among other tasks. In some embodiments, such positional/orientation information may be received at the head-mounted display CPU/GPU/extended reality processor 332 or other processing resource from the remotely located laptop or desktop information handling system 300 via a network adapter as described herein.

The HMD 320 in an embodiment may further include code instructions and sensors for one or more subsystems capable of identifying one or more landmarks within three-dimensional image information as described herein for use as input to the landmark tracking module 346. For example, the landmark tracking module 346 in an embodiment may access the three-dimensional image information of one or more nearby landmarks captured by the camera 328 of the HMD 320. In some embodiments, the landmark tracking module 346 may identify the physical boundaries of one or more potential landmarks within the three-dimensional image captured by the camera 328. Once the physical boundaries of the landmarks are identified by the landmark tracking module 346 in an embodiment, the distance between these identified items and the HMD 320 may be determined.

A plurality of IR emitters 336 may be mounted along the exterior of the head-mounted display 320, in an embodiment. Each of the IR emitters 336 (e.g., an infrared light emitting diode) in an embodiment may operate to emit infrared (IR) light toward the environment surrounding the HMD 320. In some embodiments, the light emitted from each IR emitter 336 may be patterned, and each IR emitter 336 may emit the same pattern, or different IR emitters 336 may emit different patterns. The intensity of light emitted from each of the IR emitters 336 in an embodiment may be controlled by the head-mounted display CPU/GPU/extended reality processor 332, a controller (not shown), or an integrated circuit or chip (not shown) executing firmware instructions of the IR emitters 336. Such firmware may also identify the position of each IR emitter 336 along the exterior of the HMD 320 (e.g., position with respect to field of view of headset).

The HMD 320 may further include one or IR detectors 338 or a camera sensor 328 capable of detecting infrared light emitted from the plurality of IR emitters 336 reflecting off the surfaces of landmarks or objects within the environment surrounding the HMD 320. IR detectors 338, in an embodiment, may be composed of IR light sensors that generate an electrical current based on received or detected IR frequencies. Electrical currents generated by the plurality of IR detectors 338 in an embodiment may be used to determine a length of time during which light emitted from an IR emitter 336 traveled toward an object in the environment surrounding the HMD 320, then travelled back toward the IR detector 338 upon reflection.

The HMD 320 may further include one or more subsystems capable of mapping the positions/orientations of the HMD 320 and one or more identified landmarks within a virtual three-dimensional environment in an embodiment. For example, the HMD 320 may include a head-mounted display (HMD) device position engine 334 that may include, in an embodiment, a simultaneous localization and mapping (SLAM) engine 335. The SLAM engine 335, in an embodiment, may access the position/orientation information for the one or more landmarks with respect to the HMD 320 generated or received by the head-mounted display CPU/GPU/extended reality processor 332, and use this information to generate a three-dimensional virtual map modeling the—HMD 320 and its surrounding physical environment, including the one or more identified landmarks in a virtual environment. In other embodiments, the head-mounted display CPU/GPU/extended reality processor 332 may receive one or more SLAM frames including three-dimensional virtual maps of the head-mounted display 320 and its surrounding physical environment from the remotely located laptop or desktop information handling system 300 via a network adapter which may operate to generate the virtual environment from SLAM data and sensors.

In an embodiment, one or more subsystems capable of rendering an image of the surrounding physical environment, a virtual environment, or a virtual environment modeled on physical environment from the perspective of the HMD 320 may also be included onboard the head HMD 320. For example, the HMD 320 may include an optics engine 354, which may access the three-dimensional virtual map generated by the SLAM engine or received from the remotely located information handling system 300 in an embodiment. The optics engine 354 in an embodiment may render a three-dimensional image of the surrounding environment including the identified one or more landmarks based on the location/orientation of the landmarks with respect to the head HMD 320 within the virtual map, as with a VR environment. In other embodiments, the optics engine 354 may render a three-dimensional image of an object projected to appear as if it is incorporated within the physical environment or a virtual environment modeled on physical environment surrounding the HMD 320, as with an AR environment or even a MR environment.

The HMD 320 in an embodiment may further include one or more subsystems capable of and displaying the rendered image of the surrounding environment within the HMD 320. For example, the head-mounted display 320 may include a head-mounted display device 340, capable of displaying the image (e.g., VR image, AR image, or MR image) rendered by the optics engine 354.

The HMD 320, in an embodiment, may further include a handheld controller 352. In an embodiment, the HMD 320 may be operatively coupled to one or more handheld controllers 352 via a wired connection or wirelessly via, for example, a Bluetooth connection. These handheld controllers 352 may allow a user of the handheld controller 352 to interact with the extended reality such as grab virtual objects or move objects within a MR environment. The handheld controller 352 may include one or more controller input controls 366 that allow the user to perform various functions while viewing an extended reality environment. In an embodiment, the controller input controls 366 may include, for example, a joystick 381 that includes a fingerprint reader sensor 382. As described herein, the fingerprint reader sensor 382 may be used to identify the user operating the handheld controller 352. When the user has been identified, the head-mounted display CPU/GPU/extended reality processor 332 or the information handling system 300 may access a fingerprint look-up table, cross-reference the detected fingerprint with the user's identification, and access an associated strap tightness level of the strap across a user's hand. The fingerprint look-up table may be maintained on the HMD 320 itself or may be maintained on the information handling system 300 operatively coupled to the HMD 320. In an embodiment, the strap tightness level (e.g., user-defined strap tightness threshold level) may be set by the user prior to or during use of the handheld controller 352 and may be referenced anytime the user places the user's finger on the fingerprint reader. In an embodiment, the handheld controller 352 may include other controller input controls 366 including a trigger 383 and buttons 384 to receive input from the handheld controller 352 to interact with operating software applications and any extended reality environment.

As described herein, the HMD 320 includes one or more handheld controllers 352. These handheld controllers 352 may each include those devices (e.g., an IR emitter or other location beacon 385) used to indicate to the HMD 320 where the handheld controllers 352 are relative to the HMD 320. In an embodiment, the handheld controller 352 may include a halo-type piece that wraps around a distal end of the handheld controller 352 and which houses one or more IR emitters (e.g., IR LED or other location beacon 385). These IR emitters may emit IR light outward which is captured by the camera 328 of the HMD 320. Visible light may also be used in some embodiments with a visible light LED. Other location beacons are contemplated including radio frequency, sonic, ultrasonic, or other beacon types. The capture of this light may indicate the relative position of the handheld controller 352 to the HMD 320 regardless of the orientation of the handheld controller 352. Other relative location devices and sensors may be used and the present specification contemplates use of these other location devices and sensors.

The handheld controller 352 may also include a gripping section with a grip sensor 380 where the user may grasp onto the handheld controller 352 for use during the extended reality experience presented at the HMD 320. Grip sensor 380 may detect a user's grasp presence in an embodiment and may further detect an amount of force or pressure of the user's grasp in a further embodiment via a pressure sensor, deflection sensor, capacitive sensor, light/IR sensor or other sensors as understood. The handheld controller 352 may also include controller input controls 366 as described herein, including a fingerprint reader sensor 380 on a joystick 381, trigger 383, button 384 or other inputs a user may use to control software applications or interact with an extended reality environment.

Still further, the handheld controller 352 may include a strap fit adjustment system 368. The strap fit adjustment system 368 may be utilized to automatically adjust the length of the strap 370 used to secure the handheld controller 352 to the user's hand. The strap fit adjustment system 368 may include one or more devices used to adjust the length and, accordingly, the tightness of the strap 370 based on one or more triggers. These triggers may include a determination that a user has defined a tightness level (e.g., via identification of the user via the fingerprint reader), a default tightness level (e.g., via identification of a new user via the fingerprint reader), a determination that an application is being executed and interacted with by the user implementing the handheld controller 352, a duration of time the user has been implementing the handheld controller 352, among other triggers. Each of these triggers may concurrently be monitored for and adjustments to the length and tightness of the strap 370 may continually be made based on the occurrence or non-occurrence of these triggers.

In order to adjust the length and tightness of the strap 370, the handheld controller 352 may include a strap tensioner mechanism 372. In an embodiment, the strap tensioner mechanism 372 may include a stepper motor driving a ratchet operatively coupled to a proximal end of the strap 370 having a rack and pinion structure section, a rachet and spool, or some other interference structure to engage the rachet and any corresponding rack, pinion gear, or pinion structure thereon and an end of the retaining strap 370, for example inside the housing of the handheld controller 352.

In this embodiment, where it is determined that the strap 370 is to be tightened or loosened, the stepper motor may engage the ratchet to either decrease the length of the strap 370 or increase the length of the strap 370 outside of the housing of the handheld controller 352 or otherwise usable to retain a user's hand, respectively via the interference structure and at least a portion of the strap engaged with the rachet, rack, pinion, or other mechanical element of the strap tensioner mechanism 372 used.

In an embodiment, the strap tensioner mechanism 372 may include a stepper motor and a series of ratcheting spools operatively coupled to a proximal end of the strap 370 and any interference structure on a portion of the strap 370. For example, an interference structure may include a strap attachment to the spool, a rack, or higher friction portion of the strap to engage the spool. In this embodiment, where it is determined that the strap 370 is to be tightened or loosened, the stepper motor may engage the ratcheting spools to either decrease the length of the strap 370 or increase the length of the strap 370 outside the housing of the handheld controller 352 or otherwise usable to retain a user's hand, respectively.

In an embodiment, the strap tensioner mechanism 372 may include an inflatable bladder formed into the strap 370 and operatively coupled to a fluid reservoir within the handheld controller 352. In this embodiment, where it is determined that the strap 370 is to be tightened or loosened, a pump may pass the fluid from the fluid reservoir to the bladder in the strap 370 to decrease the length of the strap 370 outside the housing of the handheld controller 352 or otherwise usable to retain a user's hand or draw the fluid from the bladder to the fluid reservoir in order to increase the length of the strap 370. The present description contemplates other types of strap tensioner mechanisms 372 that may tighten or loosen the strap 370 across the user's hand.

In an embodiment, the strap fit adjustment system 368 may further include a strap tightness measurement system 374. The strap tightness measurement system 374 may monitor the tightness of the strap 370 across the user's hand and provide feedback to, for example, a head-mounted display CPU/GPU/extended reality processor 332 for a determination as to whether the tightness should be adjusted or a confirmation that the tightness level has been achieved. In an embodiment, the strap tightness measurement system 374 may include a sensor such as a strain gauge, pressure sensor, deflection sensor or other sensor operatively coupled to a distal end of the strap 370 and opposite the strap tensioner mechanism 372. In one embodiment, as the strap tensioner mechanism 372 tightens or loosens the strap 370 outside the housing of the handheld controller 352 or otherwise usable to retain a user's hand, the strain gauge may detect a strain placed on the strain gauge by the strap 370 and provide output to the head-mounted display CPU/GPU/extended reality processor 332 describing a tightness level at any given time.

In another embodiment, the strap tightness measurement system 374 may include a sensor that includes a shape memory wire placed within the strap 370. The shape memory wire may be any wire that returns to a pre-deformed shape after being deformed. In this embodiment, as the strap tensioner mechanism 372 loosens or tightens the strap 370, the shape of the shape memory wire may be mechanically changed (e.g., lengthened/deflected/shortened) resulting in a detectable change in the electrical and/or magnetic properties of the shape memory wire. This detected change may be indicative of strain and provided as output to the head-mounted display CPU/GPU/extended reality processor 332 describing a tightness level at any given time.

With the strap fit adjustment system 368, the user may have the handheld controller 352 strapped onto the user's hand via the strap 370 at an automatically determined or controlled tightness level. During operation, the strap tightness measurement system 374 may react to one or more triggers. For example, as the user moves the handheld controller 352, various positional sensors such as an accelerometer 376 or grip sensor 380 within the handheld controller 352 may indicate to a processing device (e.g., a microcontroller 378 within the handheld controller 352) that the length of the strap 370 is to be increased to, for example, a maximum length. This extension of the length to the strap 370 may facilitate the user in slipping the user's hand between the housing of the handheld controller 352 and an interior surface of the strap 370 when the handheld controller 352 is moving but the grip sensor 380 indicates that the user has yet to place a hand around the handheld controller 352 and under strap 370. As described herein, the length of the strap 370 may be increased by actuating a strap tensioner mechanism 372 that releases tension on the strap 370 and lengthening the strap 370.

In another embodiment, the handheld controller 352 may include the grip sensor 380. The grip sensor 380 may detect the presence of a user's hand gripping the housing of the handheld controller 352. In an example, this grip sensor may be a button that is pressed as the user grips the handheld controller 352. In another embodiment, the grip sensor 380 may include one or more of a capacitive sensor, an electrical resistance sensor, and a piezo touch sensor, an ambient light sensor, among other sensors. When a user's touch has been detected, the strap tensioner mechanism 372 of the strap fit adjustment system 368 may be activated to increase the tightness level of the strap 370 across the user's hand to, for example, a predefined tightness threshold level or a custom selectable tightness threshold level selected by the user. This predefined tightness threshold level may be a default threshold tightness level in an embodiment. In another embodiment, the predefined tightness threshold level may be a user-defined custom tightness threshold level. In an embodiment, this user-defined custom tightness threshold level may be set using a graphical user interface presented to a user via the HMD 320. This graphical user interface may include a menu slide bar or other software control that allows a user to select a general tightness threshold level as well as a tightness threshold level based on the application being executed, for example. As described herein, the controller input controls 366 may include a fingerprint sensor 382. In an embodiment, the fingerprint sensor 382 may form part of a joystick 381, a button 383, trigger 384 or other input control 366 and, as such, a user may place the user's thumb or finger on the joystick 381 controller input control 366 for the user's fingerprint to be read. As this occurs, data related to the user's fingerprint may be relayed to a processing device to access a look-up table containing fingerprint data and correlating user identification data. In an embodiment, this processing device and look-up table be on the HMD 320 or, alternatively, on an information handling system 300 operatively coupled to the HMD 320 and its handheld controller 352. When the user has been identified, the user-defined tightness threshold level may be determined from a user profile and relayed to the microcontroller 378 that controls the activation of the strap tensioner mechanism 372 to loosen or tighten the strap 370 accordingly. In this way, multiple users of the handheld controller 352 with different hand sizes or tightness preferences may automatically adjust the tension of the strap 370 to a pre-defined or selected level via the strap fit adjustment system 368.

In order to determine whether a tightness threshold level has been achieved, the microcontroller 378 may receive output from the strap tightness measurement system 374 of a current strap tightness level described herein. At this point the strap tightness measurement system 374 may continuously monitor for the tightness level at the strap 370 and provide output when that tightness threshold level has been achieved with the current tightness level. If the tightness level changes as detected by the strain gauge or other sensor of the strap tightness measurement system 374, the output from the strap tightness measurement system 374 may cause the microcontroller 378 to engage the strap tensioner mechanism 372 accordingly in order to adjust to the appropriate tightness level by tightening or relaxing the strap 370 to meet the tightness threshold level.

The present description further contemplates that the tightness level of the strap 370 may be adjusted during operation of the HMD 320 and handheld controller 352 by the user. For example, as the user engages in the execution of various applications on the HMD 320, the tightness threshold level of the strap 370, and thus the current tightness level may be altered. By way of example, where the HMD 320 detects that a first-person shooter game is being executed, the head-mounted display CPU/GPU/extended reality processor 332 may provide this data to the microcontroller 378 (e.g., via Bluetooth communication) for the microcontroller 378 to adjust the tightness (e.g., the length) of the strap 370 across the user's hand. Because such an application may require a user to swing the user's hand about rapidly in order to engage in the extended reality presented at the HMD 320, the tightness threshold level may be increased so that the handheld controller 352 does not slip out of the user's grasp. Other applications may have an opposite effect. For example, where the head-mounted display CPU/GPU/extended reality processor 332 of the HMD 320 detects that an art program or an extended reality videoconference is being executed, the tightness threshold level of the strap 370 may be reduced in order to allow relatively more movement of the user's hand when, for example, drawing or sculpting or conversing within the extended reality environment. In an embodiment and during execution of an application, the head-mounted display CPU/GPU/extended reality processor 332 may direct the microcontroller 378 to adjust the tightness of the strap 370 based on changing and anticipated events where use of the handheld controller 352 may require a change in tightness threshold level of the strap 370 across the user's hand. These anticipated events may be relayed from the processor executing the application to the head-mounted display CPU/GPU/extended reality processor 332 of the HMD 320 and from the head-mounted display CPU/GPU/extended reality processor 332 to the microcontroller 378 where execution of the code instructions for the strap fit adjustment system 368 makes those changes to the tightness of the strap 370 to meet changing tightness threshold levels dynamically as described herein.

Figure 4:
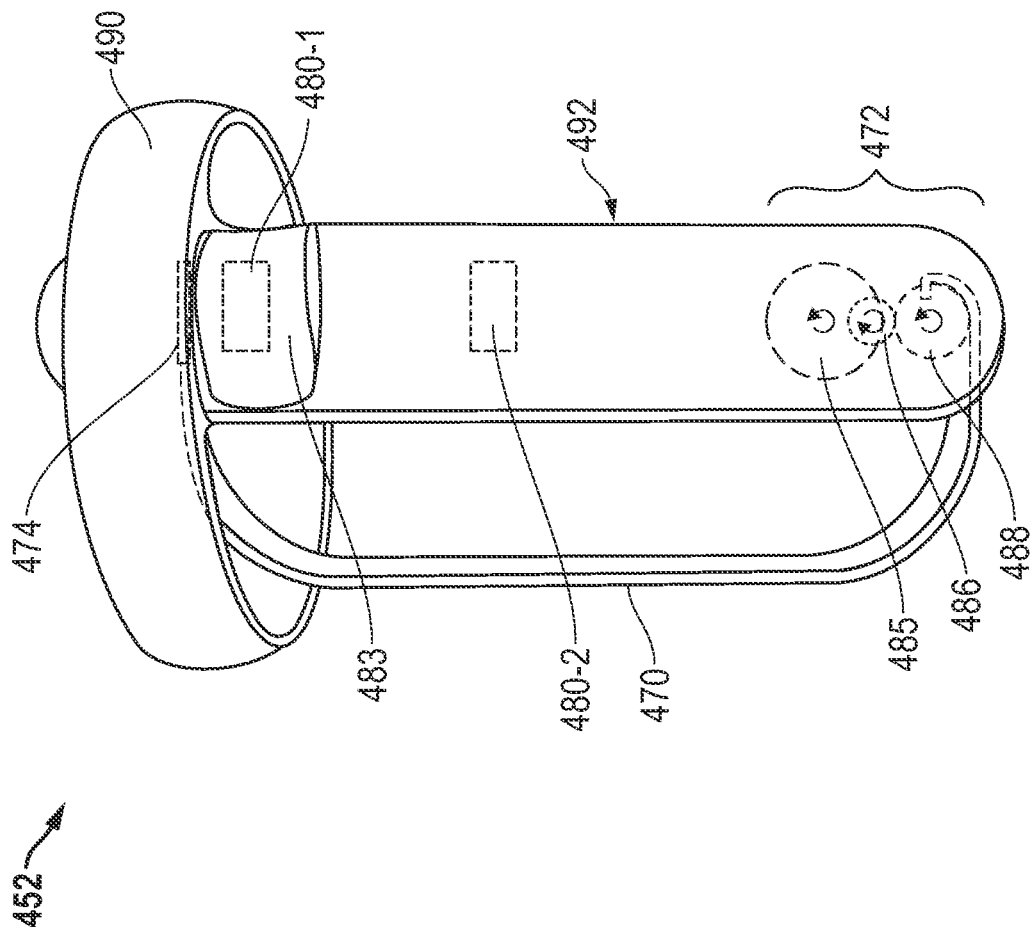
FIG. 4 is a bottom perspective view of a handheld controller according to an embodiment of the present disclosure.

FIG. 4 is a back view of a handheld controller 452 according to an embodiment of the present disclosure. This handheld controller 452 may include a grip portion 492 operatively coupled to a halo portion 490. The grip portion 492 may the portion of the handheld controller 452 where the user may wrap the user's fingers around in order to grasp and hold the handheld controller 452. As described herein, the halo portion 490 may include one or more IR emitters (e.g., IR LEDs) that emit IR light outward visible light emitters, or other location beacons which is captured by the camera or sensors of the HMD. The capture of this light may indicate the relative position of the handheld controller 452 to the HMD regardless of the orientation of the handheld controller 452. Other relative location devices and sensors may be used and the present specification contemplates use of these other location devices and sensors.

FIG. 4 further shows a first grip sensor location 480-1 and a second grip sensor location 480-2. The first grip sensor location 480-1 may be placed at a controller input control such as a trigger 483. At this first grip sensor location 480-1 a sensor such as a button, a capacitive sensor, an electrical resistance sensor, and a piezo touch sensor, ambient light sensor, among other sensors may be placed to detect the user's finger, for example. In an embodiment, the first grip sensor location 480-1 may include a fingerprint sensor in. Similarly, at the second grip sensor location 480-2 a sensor such as a button, a capacitive sensor, ambient light sensor, an electrical resistance sensor, and a piezo touch sensor, among other sensors may be placed to detect the user's hand or portion of the palm. The second grip sensor location 480-2 may be at any location around or along the shaft of the grip portion 492 top to bottom or around from the front (not shown) to the back.

The handheld controller 452 shown in FIG. 4 also shows an example embodiment of a strap fit adjustment system that includes a strap tensioner mechanism 472 and a strap tightness measurement system sensor 474. In this example, the strap tensioner mechanism 472 may include a driving gear 485 operatively coupled to a stepper motor used to rotate the driving gear 485. The strap tensioner mechanism 472 may also include an intermediary gear 486 and a tensioning gear 488. In the embodiment, the tensioning gear 488 may be operatively coupled to a proximal end of the strap 470 that is used to assist the user in holding the handheld controller 452 as described herein. As a result of activating the stepper motor the driving gear 485 in a first direction. The driving gear 485 may drive the intermediary gear 486 in an opposite rotation to that of the driving gear 485. As the intermediary gear 486 rotates, the tensioning gear 488 may also be rotated in an opposite direction to that of the intermediary gear 486 but the same as the driving gear 485. It is appreciated that additional gears or gear arrangements are anticipated and may be implemented to rotate the tensioning gear 488.

As the tensioning gear 488 rotates, the strap 470 may be wrapped around a portion of the tensioning gear 488. The relative gear ratios of the driving gear 485, the intermediary gear 486, and the tensioning gear 488 may be such that the torque of the tensioning gear 488 is increased while the rotatability of the tensioning gear 488 is reduced. This allows for the tensioning gear 488 to slowly wind the strap 470 out of or into the housing of the handheld controller 452 to increase the length of the strap 470 or reduce the length of the strap 470, respectively. The activation of the stepper motor may be controlled via a microcontroller such as microcontroller 378 described in connection with FIG. 3. As the strap tightens around the user's hand, it pulls or deforms the strap tightness measurement system sensor 474 such as a strain gauge pressure sensor, deflection sensor, memory wire or other strap tightness measurement system sensors 474. The reverse is also true for loosening the strap. This strap tightness measurement system sensor 474 indicates a tightness level via the strap tightness measurement system sensor 474 for use by the strap tightness measurement system to meet a pre-defined tightness threshold level.

Figure 5:
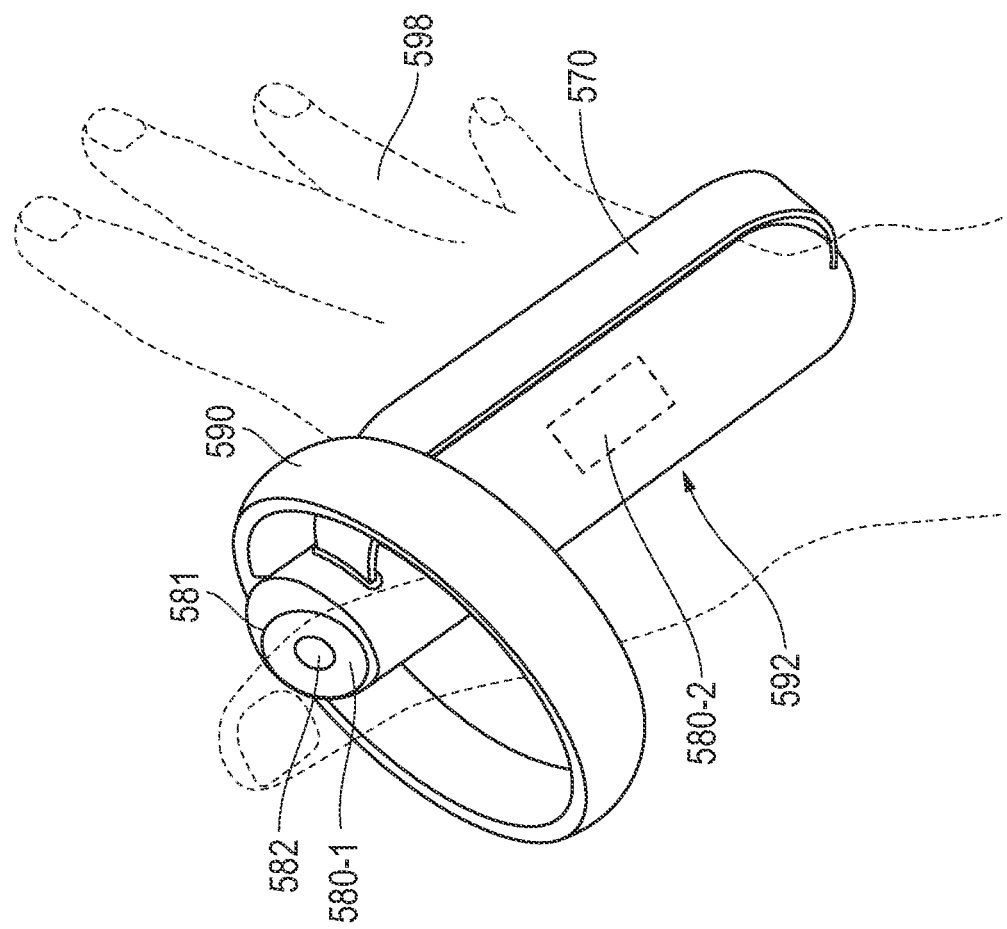
FIG. 5 is a perspective view of a handheld controller interacting with a user's hand according to an embodiment of the present disclosure.

FIG. 5 is a perspective view of a handheld controller 552 interacting with a user's hand 598 according to an embodiment of the present disclosure. As shown, the user has placed the user's hand 598 within the void between the grip portion 592 and the strap 570 of the handheld controller 552. Again, as described herein, the grip portion 592 operatively coupled to a halo portion 590. The halo portion 590 may include one or more IR emitters (e.g., IR LEDs) that emit IR light outward which is captured by the camera of the HMD. The capture of this light may indicate the relative position of the handheld controller 552 to the HMD regardless of the orientation of the handheld controller 552. Other relative location devices and sensors may be used and the present specification contemplates use of these other location devices and sensors.

In an embodiment, the handheld controller 552 may include an accelerometer (not shown) to detect movement of the handheld controller 552 such as when the user picks up the handheld controller 552. Because the user has yet to place the user's hand in the strap 570, a grip sensor at the second grip sensor location 580-2 or at the first grip sensor location 580-1 at the joystick-type controller input control device may be used to determine when the user has gripped the handheld controller 552. Therefore, even though the accelerometer within the handheld controller 552 does detect movement of the handheld controller 552, the tightness of the strap 570 is not increased when the grip sensors, either 580-1 or 580-2, have not detected the user's hand. In an embodiment, where the accelerometer does detect movement of the handheld controller 552 but the grip sensors at the second grip sensor location 580-2 or at the first grip sensor location 580-1 does not detect the user's hand, the strap tightness measurement system may loosen the strap 570 so that user may more easily insert the user's hand within the strap 570.

As the grip sensors at the second grip sensor location 580-2 or at the first grip sensor location 580-1 and the accelerometer has detected movement of the handheld controller 552, the strap tightness measurement system may tighten the strap 570. As described herein, the handheld controller 552 includes a joystick 581 that includes a fingerprint reader sensor 582 and a first grip sensor 580-1 in some embodiments that the user may implement to allow the handheld controller 552 to detect the identification of the user. As the fingerprint reader sensor 582 detects the user's fingerprint, a processing resource in the handheld controller 552 may access a look-up table or other user fingerprint dataset to determine who the user is and provide, if available, a customized and preset tightness threshold level associated with the user. Again, the tightness level reached may be dynamically changed to meet a dynamically changing tightness threshold level and based on a variety of individual or groupings of factors as the user uses the handheld controller 552. Among these factors may be a user tightness setting, a class or category of application being executed while the user implements the handheld controllers, the duration of use of the handheld controllers by the user, a grip force detected by a grip sensor, measurements from one or more sensors such as an accelerometer, limits on tightness set for user comfort or safety, among other factors. Each of these factors may be set as data points used as input into a tightness level machine learning algorithm in an embodiment that provides, as output, a target tightness threshold level for one or more different users. In other embodiments, a rule-based tightness table or system may be used to set the tightness generated by the strap tensioner mechanism. Again, in an embodiment, an application mode system may be used to determine that one or more particular applications or application category is being executed on the HMD. Upon execution of the application mode system, the processing device of the HMD or the information handling system operatively coupled thereto may provide data indicative of how to dynamically adjust the tightness level of the strap via the strap tensioner mechanism across the user's based on use characteristics of the handheld controller by the user during execution of that application.

FIG. 5 also shows a joystick-type controller input control 581. The joystick-type controller input control 581 may be actuated by a user using the user's thumb. The user may place the user's thumb on top of the joystick-type controller input control 581 and press the joystick-type controller input control 581 forward, backwards, to the left, to the right, inward like a button, or any other direction between these directions. During operation, the joystick-type controller input control 581 may be used by the user to, for example, direct an avatar in a first-person shooter game executed on the HMD throughout an extended reality environment.

In the embodiment shown in FIG. 5, the joystick-type controller input control 581 includes a fingerprint reader sensor 582. As described herein, the fingerprint reader sensor 582 may help to identify the user of the handheld controller 552 and adjust the length of a strap 570 on the handheld controller 552. When the fingerprint of the user has been scanned, the head-mounted display CPU/GPU/extended reality processor or other processing resource (not shown) may access a fingerprint look-up table, cross-reference the detected fingerprint with the user's identification, and access an associated strap tightness threshold level for the strap across a user's hand. The fingerprint look-up table may be maintained on the HMD itself or may be maintained or processed on the information handling system operatively coupled to the HMD. In an embodiment, the strap tightness threshold level may be set by the user prior to or during use of the handheld controller 552 and may be referenced anytime the user places the user's finger on the fingerprint reader sensor 582. Joystick 581 may include a grip sensor 580-1 in an embodiment as well to detect absence or presence of a user's hand on the fingerprint reader sensor 582.

Figure 6:
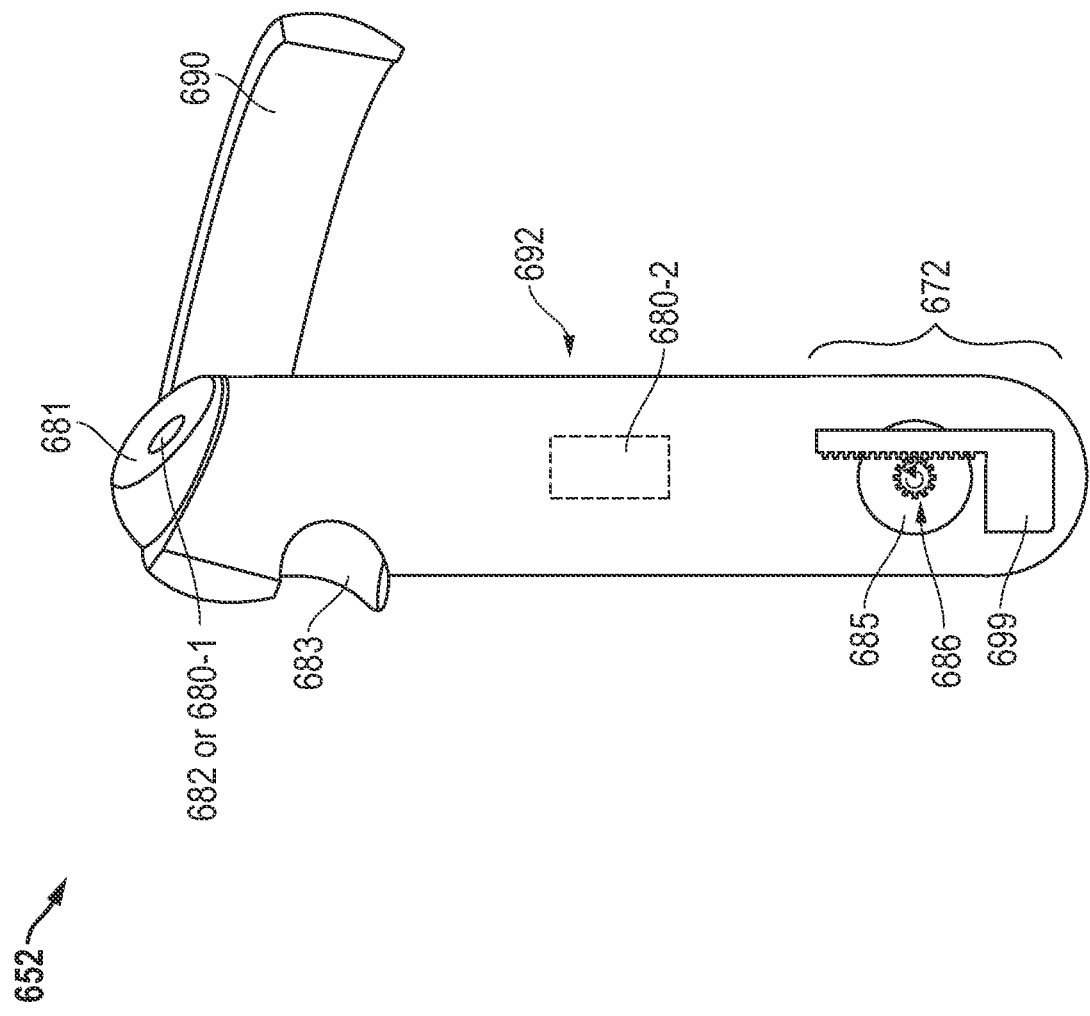
FIG. 6 is a side, cutout view of a handheld controller with a strap fit adjustment system according to an embodiment of the present disclosure.

FIG. 6 is a side, cutout view of a handheld controller 652 with a strap fit adjustment system according to an embodiment of the present disclosure. As described herein, the strap fit adjustment system may include a strap tensioner mechanism 672 used to increase the tension of the strap (not shown) across the user's hand. In the example embodiment, the strap tensioner mechanism 672 may include a driving gear 686 operatively coupled to a stepper motor used to drive a geared spool wheel 685 attached to or interference-engaged with the strap and in interference with a rack/rachet mechanism 699. The strap tensioner mechanism 672 may also include an intermediary gear operatively coupled to and used to drive the movement of either the spool 685 or the rack/ratchet 699. Either the spool wheel 685 or the rack/ratchet 699 may be driven by the stepper motor relative to the other to cause the spool wheel 685 to spool or unspool the strap. In one embodiment, the rack/ratchet 699 may be operatively coupled to a proximal end of the strap (not shown) to move the strap into or out of the body of the handheld controller 652 to assist the user in holding the handheld controller 652 as described herein. As a result of activating the stepper motor of the geared spool wheel 685 in a first direction, the geared spool wheel 685 may rotate to spool the strap or raise the rack/rachet 699 to pull the strap and tighten the strap across the user's hand. As the geared spool wheel 685 rotates, the teeth geared spool wheel 685 may engage teeth or notches on the rack/ratchet 699 to pass the rack/ratchet 699 upward or move the geared spool wheel 685 to decrease the length of the strap. As the geared spool wheel 685 rotates in an opposite direction, the teeth geared spool wheel 685 may engage the teeth or notches on the rack/ratchet 699 to pass the rack/ratchet 699 downward or move the geared spool wheel 685 in the opposite direction to increase the length of the strap. It is appreciated that additional gears or gear arrangements are anticipated and may be implemented to drive the geared spool wheel 685 or the rack/ratchet 699.

As described herein, the handheld controller 652 may include one or more controller input controls. In the example embodiment shown in FIG. 6, the handheld controller 652 includes a trigger-type controller input control 683 and a joystick-type controller input control 681. The trigger-type controller input control 683, as described herein, may include a grip sensor to detect the presence of the user's finger. Joystick 681 may have a grip sensor 680-1 or a fingerprint sensor 682 in addition to or to replace or supplement a grip sensor placed at grip sensor location 680-2. Activation of the trigger-type controller input control 683 allows the user to engage in an extended reality environment presented to the user via the HMD.

The joystick-type controller input control 681 may be actuated by a user using the user's thumb. The user may place the user's thumb on top of the joystick-type controller input control 681 and press the joystick-type controller input control 681 forward, backwards, to the left, to the right, or any other direction between these directions. During operation, the joystick-type controller input control 681 may be used by the user to, for example, direct an avatar in a first-person shooter game executed on the HMD throughout an extended reality environment. Further, the joystick-type controller input control 681 includes a fingerprint reader 682 or grip sensor 680-1 in various embodiments. As described herein, the fingerprint reader 682 may help to identify the user of the handheld controller 652 and adjust the length of a strap (not shown) on the handheld controller 652. When the user has been identified, the head-mounted display CPU/GPU/extended reality processor or other processing resource may access a fingerprint look-up table, cross-reference the detected fingerprint with the user's identification, and access an associated strap tightness threshold level of the strap across a user's hand. The fingerprint look-up table may be maintained on the HMD itself or may be maintained on the information handling system operatively coupled to the HMD. In an embodiment, the strap tightness threshold level may be set by the user prior to or during use of the handheld controller 652 and may be referenced anytime the user places the user's finger on the fingerprint reader 682.

In an embodiment, the handheld controller 652 may include a grip portion 692 operatively coupled to a halo portion 690. The grip portion 692 may the portion of the handheld controller 652 where the user may wrap the user's fingers around in order to grasp and hold the handheld controller 652. As described herein, the halo portion 690 may include one or more IR emitters (e.g., IR LEDs) that emit IR light outward other location beacons such as radio frequency beacons, sonic beacons, ultrasonic beacons which is captured by the camera of the HMD. The capture of this light may indicate the relative position of the handheld controller 652 to the HMD regardless of the orientation of the handheld controller 652. Other relative location devices and sensors may be used and the present specification contemplates use of these other location devices and sensors.

Figure 7:
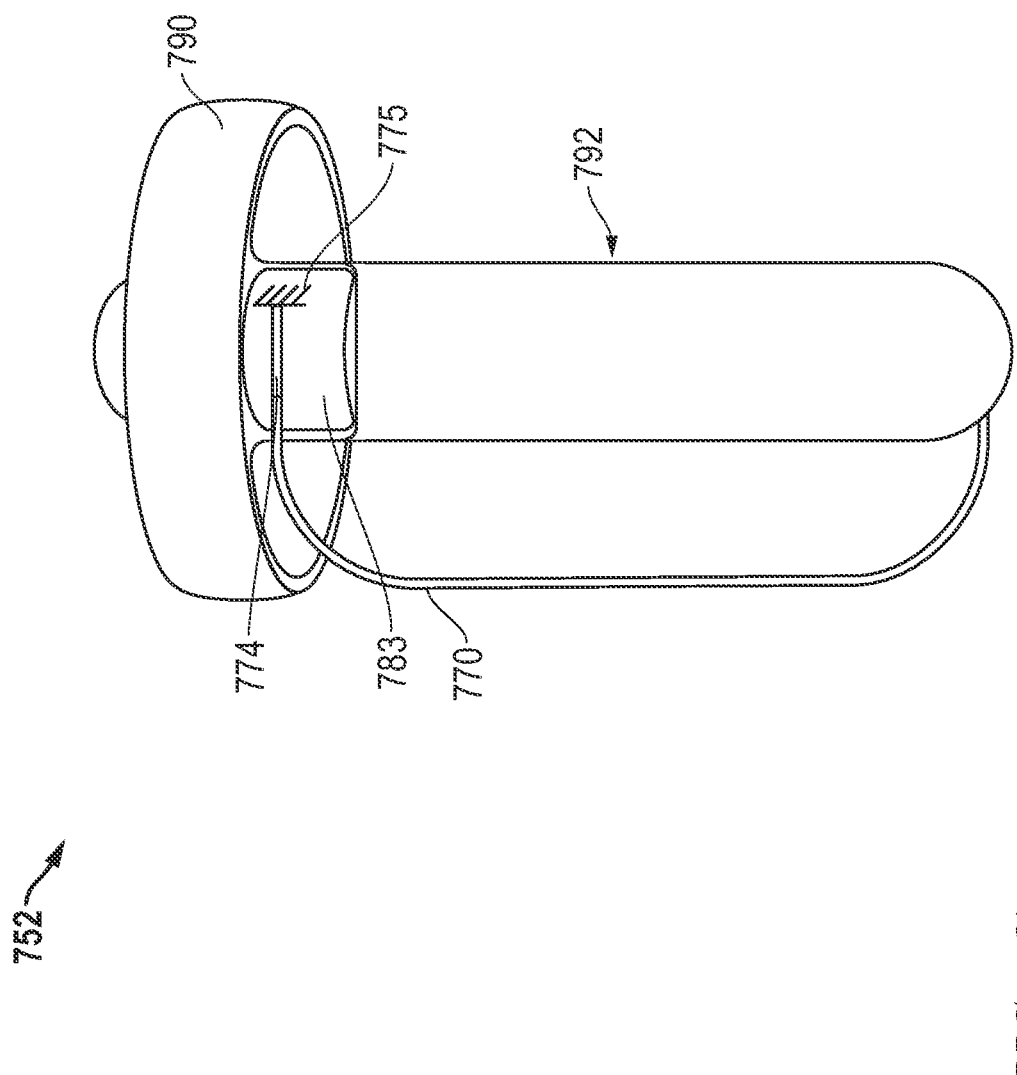
FIG. 7 is a rear, cutout view of a handheld controller with a strap tightness measurement system according to an embodiment of the present disclosure.

FIG. 7 is a rear, cutout view of a handheld controller 752 with a strap tightness measurement system 774 according to an embodiment of the present disclosure. In the embodiment of FIG. 7, the strap tightness measurement system 774 includes a strain gauge operatively coupled to a distal end of the strap 770. In an embodiment, the strain gauge 775 or other sensor of the strap tightness measurement system 774 may include an insulating flexible backing that supports a metallic foil arranged in, for example, a serpentine arrangement. As the metallic foil is deformed via the strap tightening across the user's hand via the strap tensioner mechanism (not shown), an electrical resistance across the metallic foil changes which may be detected and provided as input to the microcontroller (not shown) of the handheld controller 752. This input may be used to determine when and if a tightness threshold level has been achieved via the strap fit adjustment system automatically as described in embodiments herein.

In an embodiment, the handheld controller 752 may include a grip portion 792 operatively coupled to a halo portion 790. The grip portion 792 may be the portion of the handheld controller 752 where the user may wrap the user's fingers around in order to grasp and hold the handheld controller 752. As described herein, the halo portion 790 may include one or more location beacons such as IR emitters (e.g., IR LEDs) that emit IR light outward (or other types of bacons such as radio frequency beacons, sonic beacons, ultrasonic beacons, or other beacon types) which is captured by the camera of the HMD. The capture of this light or other beacon indicators may indicate the relative position of the handheld controller 752 to the HMD regardless of the orientation of the handheld controller 752. Other relative location devices and sensors may be used and the present specification contemplates use of these other location devices and sensors.

Additionally, in the example embodiment shown in FIG. 7, the handheld controller 752 includes a trigger-type controller input control 783 or the grip portion 792 and a joystick-type controller input control (not shown). The trigger-type controller input control 783 or the grip portion 792, as described herein, may include a grip sensor to detect the presence of the user's finger or hand. Activation of the trigger-type controller input control 783, joystick, other button or movement detected via an accelerometer or location beacon allows the user to engage in an extended reality environment presented to the user via the HMD.

Figure 8:
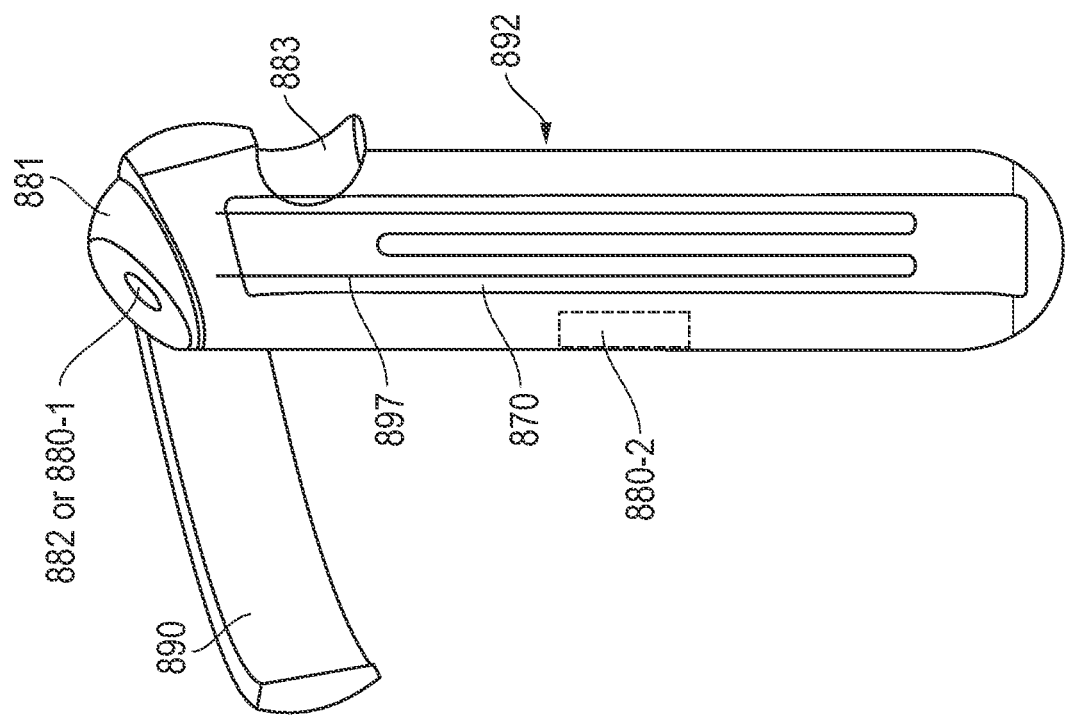
FIG. 8 is a side, cutout view of a handheld controller with a strap tightness measurement system according to another embodiment of the present disclosure.

FIG. 8 is a side, cutout view of a handheld controller 852 with a strap tightness measurement system according to another embodiment of the present disclosure. In the embodiment of FIG. 8, the strap tightness measurement system includes a shape memory wire 897 placed within the strap 870. The shape memory wire 897 may be any wire that returns to a pre-deformed shape after being deformed. In this embodiment, as the strap tensioner mechanism (not shown) loosens or tightens the strap 870, the shape such as length or shortness or deflection of the shape memory wire 897 may be mechanically changed resulting in a detectable change in the electrical and/or magnetic properties of the shape memory wire. This detected change may be provided as output to the head-mounted display CPU/GPU via the extended reality processor or other processor, executing the strap fit adjustment system of the HMD describing a tightness threshold level at any given time. This input may be used to dynamically adjust the tightness level of the strap 870 across the user's hand to meet a tightness threshold level according to the embodiments described herein.

Again, in an embodiment, the handheld controller 852 may include a grip portion 892 operatively coupled to a halo portion 890. The grip portion 892 may the portion of the handheld controller 852 where the user may wrap the user's fingers around in order to grasp and hold the handheld controller 852. In an embodiment, the grip portion may include a grip sensor 880-2. As described herein, the halo portion 890 may include one or more beacon emitters (e.g., visible or IR LEDs) that emit visible or IR light outward which is captured by the camera of the HMD. The capture of this light may indicate the relative position of the handheld controller 852 to the HMD regardless of the orientation of the handheld controller 852. Other relative location devices and sensors may be used and the present specification contemplates use of these other location devices and sensors.

In the example embodiment shown in FIG. 8, the handheld controller 852 includes a trigger-type controller input control 883 and a joystick-type controller input control 881. The trigger-type controller input control 883 or joystick 880, as described herein, may include a grip sensor such as 880-1 to detect the presence of the user's finger. Activation of the trigger-type controller input control 883, joystick 881, button grip sensor, movement via an accelerometer or location beacons allows the user to engage in an extended reality environment presented to the user via the HMD.

The joystick-type controller input control 881 may be actuated by a user using the user's thumb. The user may place the user's thumb on top of the joystick-type controller input control 881 and press the joystick-type controller input control 881 forward, backwards, to the left, to the right, inward, or any other direction between these directions. During operation, the joystick-type controller input control 881 may be used by the user to, for example, direct an avatar in a first-person shooter game executed on the HMD throughout an extended reality environment. Further, the joystick-type controller input control 894 includes a fingerprint reader 882. As described herein, the fingerprint reader 882 may help to identify the user of the handheld controller 852 and adjust the length of a strap (not shown) on the handheld controller 852. When the user has been identified, the head-mounted display CPU/GPU (not shown) may access a fingerprint look-up table, cross-reference the detected fingerprint with the user's identification, and access an associated strap tightness threshold level of the strap across a user's hand. The fingerprint look-up table may be maintained on the HMD itself or may be maintained on the information handling system operatively coupled to the HMD. In an embodiment, the strap tightness threshold level may be set by the user prior to or during use of the handheld controller 852 and controlled via the embodiments herein. In one embodiment, the strap tightness threshold level specific to an identified user may be referenced anytime the user places the user's finger on the fingerprint reader 882.

Figure 9:
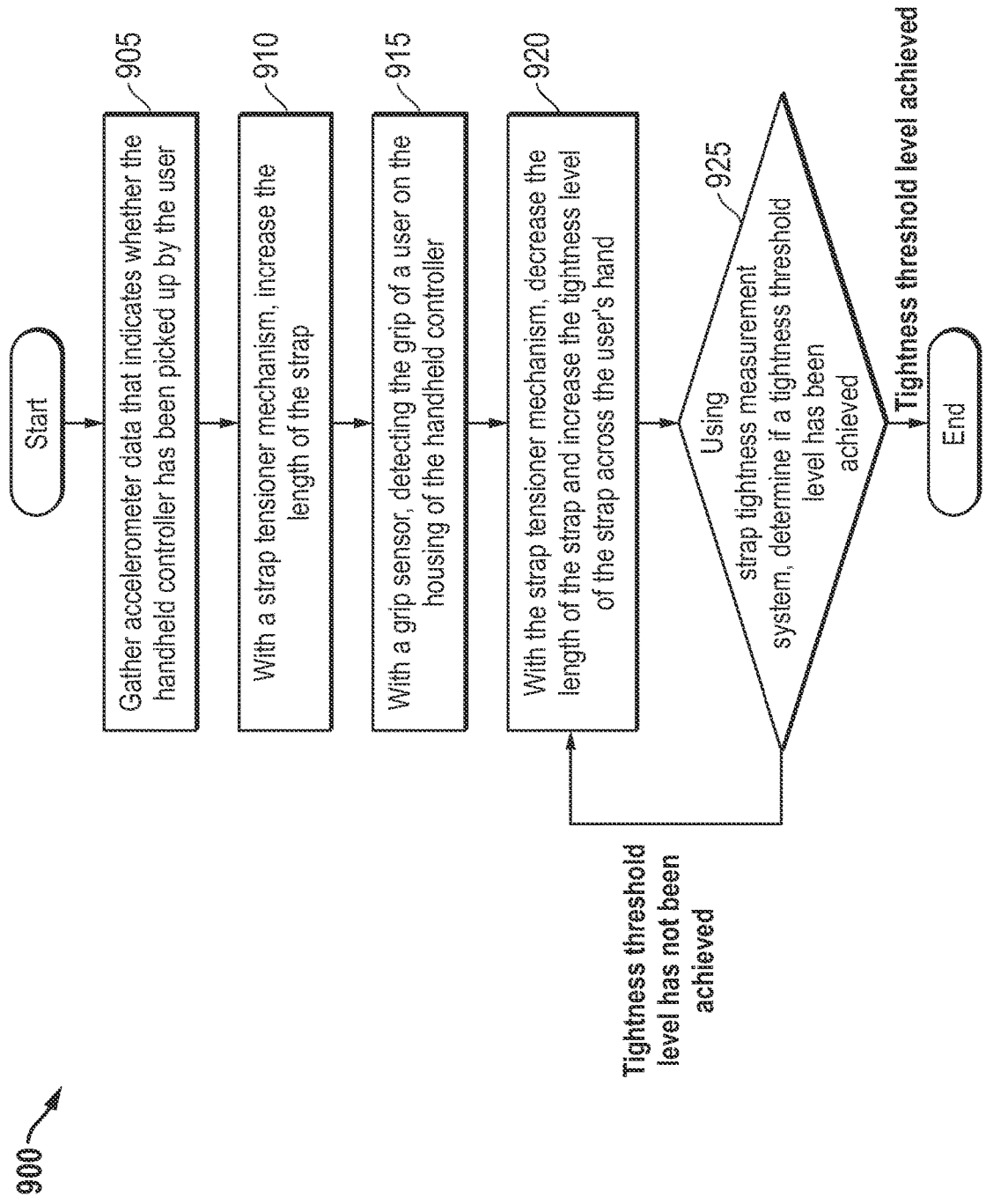
FIG. 9 is a flow diagram illustrating a method of adjusting, via a strap fit adjustment system, a tightness of a strap of an extended reality handheld controller according to an embodiment of the present disclosure.

FIG. 9 is a flow diagram illustrating a method 900 of adjusting, via a strap fit adjustment system, a tightness of a strap of an extended reality handheld controller for use with an HMD and extended reality software application according to an embodiment of the present disclosure. In an embodiment, the method 900 may include, at block 905, gathering accelerometer data that indicates whether the handheld controller has been picked up by a user. For example, as the user moves the handheld controller, various positional sensors such as the accelerometer within the handheld controller may indicate to a processing device (e.g., a microcontroller within the handheld controller) that the handheld controller is being moved. A grip sensor may indicate that no user's hand currently grips the handheld controller. At block 910, the strap tensioner mechanism may increase the length of the strap. This increase in the length of the strap may extend the strap to, for example, a maximum length. This extension of the length to the strap may facilitate the user in slipping the user's hand between the housing of the handheld controller and an interior surface of the strap as described herein. The length of the strap, in an embodiment, may be increased by actuating a strap tensioner mechanism that releases tension on the strap and lengthens the strap.

The method 900 may further include, at block 915, detecting the grip of a user via a grip sensor within the handheld controller. In an example, this grip sensor may be a button that is pressed as the user grips the handheld controller. In yet another embodiment, the grip sensor may include one or more of a capacitive sensor, an electrical resistance sensor, and a piezo touch sensor, among other sensors. The grip sensor may be placed at various locations on the housing of the handheld controller. In an example embodiment, the grip sensor may be placed at a controller input control such as a trigger-type controller input control or a joystick. At this location, a sensor such as a button, a capacitive sensor, an electrical resistance sensor, and a piezo touch sensor, among other sensors may be placed to detect the user's finger, for example. Similarly, a grip sensor such as a button, a capacitive sensor, an electrical resistance sensor, ambient light sensor, and a piezo touch sensor, among other sensors may be placed within a grip portion of the housing of the handheld controller to detect the user's hand or portion of the palm.

The method 900 may also include using the strap tensioner mechanism to decrease the length of the strap outside the handheld controller body and increase the tension of the strap across the user's hand, at block 920. The strap tensioner mechanism may include one or more devices that tightens the strap across a user's hand until a tightness level has been achieved meeting a tightness threshold level. As described herein, the strap tensioner mechanism may include a stepper motor that drives a gear to either another series of gears operatively coupled to a proximal end of the strap geared spooling wheel, or a rack/ratchet that is also operatively coupled to a proximal end of the strap. Various strap tensioner mechanisms may be used as described in the present description and the present specification contemplates the use of these example strap tensioner mechanisms among others that may be used to draw a portion of the strap into the housing of the handheld controller and increase tension of the hand retaining strap.

At block 925, the method 900 includes determining, with a strap tightness measurement system, if a tightness level has been reached. In an embodiment, the strap tightness measurement system measures that tightness of the strap across the user's hand at any given time. The strap tightness measurement system may come in many forms and include those systems described herein the present disclosure such as a strain gauge, pressure gauge, deflection gauge, memory wire, or others. The tightness threshold level to be achieved many vary depending on a user-defined tightness threshold level (e.g., via identification of the user via the fingerprint reader), a default tightness threshold level (e.g., via identification of a new user via the fingerprint reader), a determination that an application is being executed and interacted with by the user implementing the handheld controller, a duration of time the user has been implementing the handheld controller, among other potential triggers that help define what the tightness level should be created by the strap tensioner mechanism to meet a given tightness threshold level.

At block 925 the strap tightness measurement system may continuously measure the tightness of the strap. Where the tightness threshold level has not been yet achieved, the method 900 may continue back to block 920 with continuing with the tightening of the strap tensioner mechanism. Where, at block 925, the strap tightness measurement system detects that the tightness level has been achieved to meet the tightness threshold level, the method 900 may end.

Figure 10:
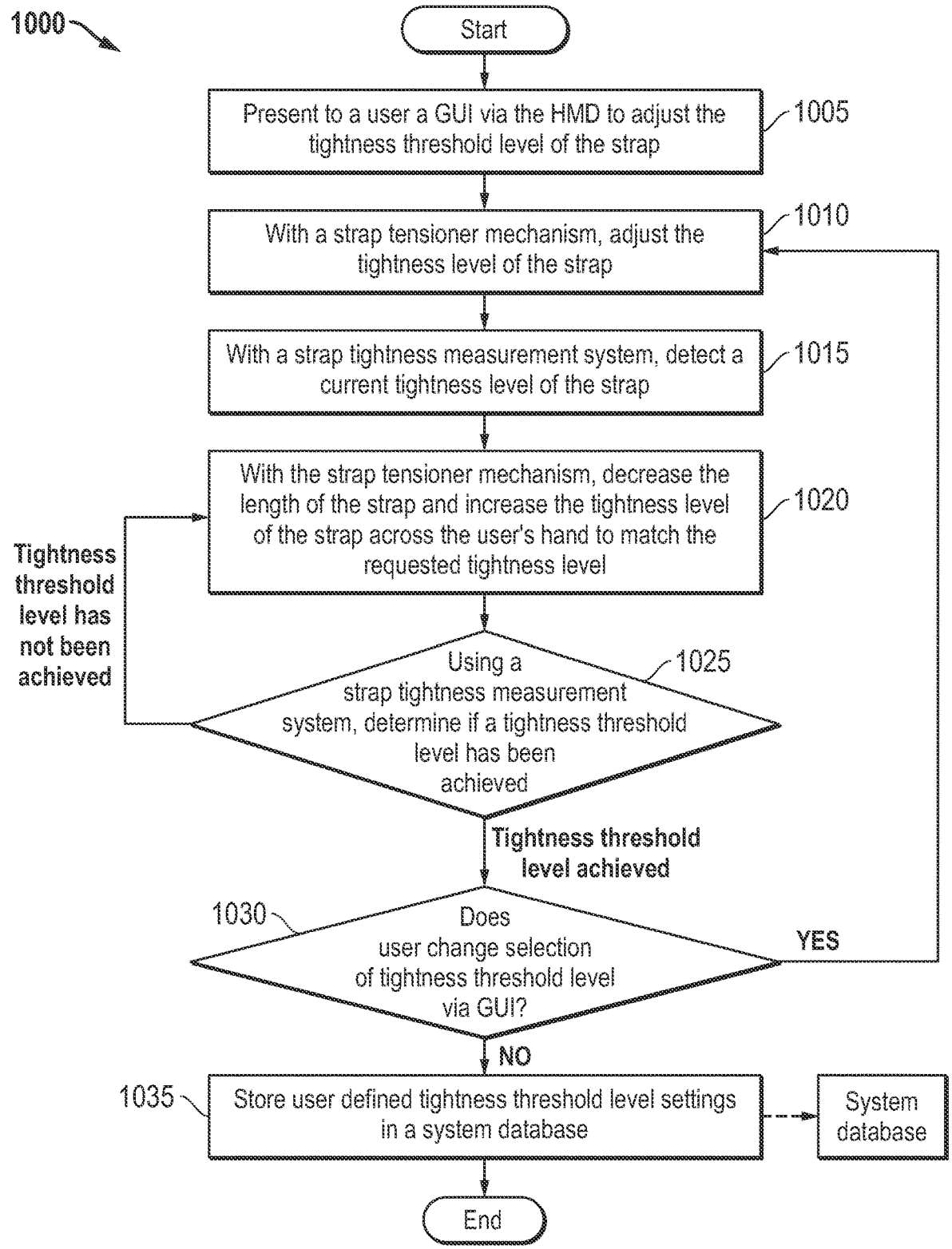
FIG. 10 is a flow diagram illustrating a method of adjusting a tightness of a strap of an extended reality handheld controller according to another embodiment of the present disclosure.

FIG. 10 is a flow diagram illustrating a method 1000 of adjusting a tightness of a strap of an extended reality handheld controller according to another embodiment of the present disclosure. The method 1000 may include, at block 1005, presenting to a user a graphical user interface (GUI) via the HMD to adjust the tightness of the strap. The GUI may be presented to a user via the display device of the HMD that may or may not be operatively coupled to an information handling system. In the embodiment where the HMD is not operatively coupled to an information handling system, a head-mounted display CPU/GPU may execute computer readable program code to present this GUI to the user and receive any inputs from the user via the handheld controller. In an embodiment, the GUI may present to a user the option to customize the tightness of the strap. Examples may include selectable boxes, dials, sliding scales, numerical input fields, among other GUIs used to allow the user to customize the tightness threshold level. In an embodiment, the user may enter in a hand size (e.g., extra-small, small, medium, large, extra-large, etc.) so that the strap fit adjustment system can provide a preselected tightness threshold level.

At block 1010, the method 1000 may include adjusting the tightness of the strap via a strap tensioner mechanism. Because the user is gripping the handheld controller as detected by one or more grip sensors, the user may access the GUI and incrementally increase the tightness level until the user is comfortable with tightness level. The user may be presented with the ability to incrementally increase the tightness via the GUI in an embodiment to set a tightness threshold level. The strap tensioner mechanism may include one or more devices that tightens the strap across a user's hand until a tightness level has been achieved meeting a desired tightness threshold level. According to various embodiments, a limit on the tightness level detected may be used to prevent the strap and handheld controller from hurting the user. Again, this tightness level may be determined using the strap tightness measurement system and this maximum tightness level may be used as an upper limit during use. In an embodiment, the strap tightness measurement system measures, at block 1015, a tightness level of the strap across the user's hand at any given time. As described herein, the strap tightness measurement system may include a strain gauge, a pressure gauge, a deflection gauge, or other tightness measuring devices described herein used to measure the tightness of the strap across the user's hand. The strap tensioner mechanism and the strap tightness measurement system may come in many forms and example embodiments have been described herein.

At block 1020, therefore, the strap tensioner mechanism may decrease the length of the strap thereby increasing the tightness level of the strap outside the housing of the handheld controller via spooling or moving rack/rachet system or other strap tensioner mechanism across the user's hand to match the requested tightness threshold level requested by the user via the GUI. Again, at block 1020, the strap tightness measurement system may be used to determine if that a requested threshold tightness level has reached the tightness threshold level. Where the requested threshold tightness level has not been yet achieved to meet the tightness threshold level, the method 1000 may continue to block 1020 with continuing with the tightening of the strap with the strap tensioner mechanism.

Where, at block 1025, the strap tightness measurement system detects, via the strap tension sensor, that the tightness level has been achieved to meet the tightness threshold level the method 1000 proceeds to block 1030. At block 1030, the method 1000 includes determining whether the user has changed a selection of tightness threshold level via the GUI described herein. As described herein, the user may access or be presented with a GUI where a user may indicate a or a new tightness threshold level. Because the user may access this GUI at any time, the strap fit adjustment system may continuously monitor for these changes by the user via the GUI so as to, in real-time, adjust the tightness level based on the user-defined tightness level. This allows a user to make further adjustments to the tightness level at any time causing the strap fit adjustment system to make those adjustments to dynamically meet a new tightness threshold level.

At block 1035, the strap fit adjustment system stores the user-defined tightness threshold level setting in a system database. Again, the user-defined tightness threshold level settings set by the user via the GUI may be stored at the system database when the user is satisfied with the tightness level.

In an embodiment, the system database may include a fingerprint look-up table. This fingerprint look-up table may include data descriptive of a fingerprint scan of a user as well as identification of the user associated with any give fingerprint scan. In this example embodiment, a fingerprint reader may be used at the handheld controller to first determine who the user is and whether the system database with its fingerprint look-up table has an entry of that scanned fingerprint. Where the scanned fingerprint is not found, the user may provide the user-defined tightness level per the method 1000 and the system database and fingerprint look-up table may be updated with the user's identification and user-defined tightness threshold level. Where the scanned fingerprint is found, the system database may relay the identification of the user and the user-defined tightness threshold levels to the HMD and handheld controller for adjustment to the tightness levels via the strap tensioner mechanism as described herein. In an embodiment, the system database may be maintained on an information handling system operatively coupled to the HMD. In another embodiment, the system database may be maintained on the HMD without the use of an information handling system.

Figure 11:
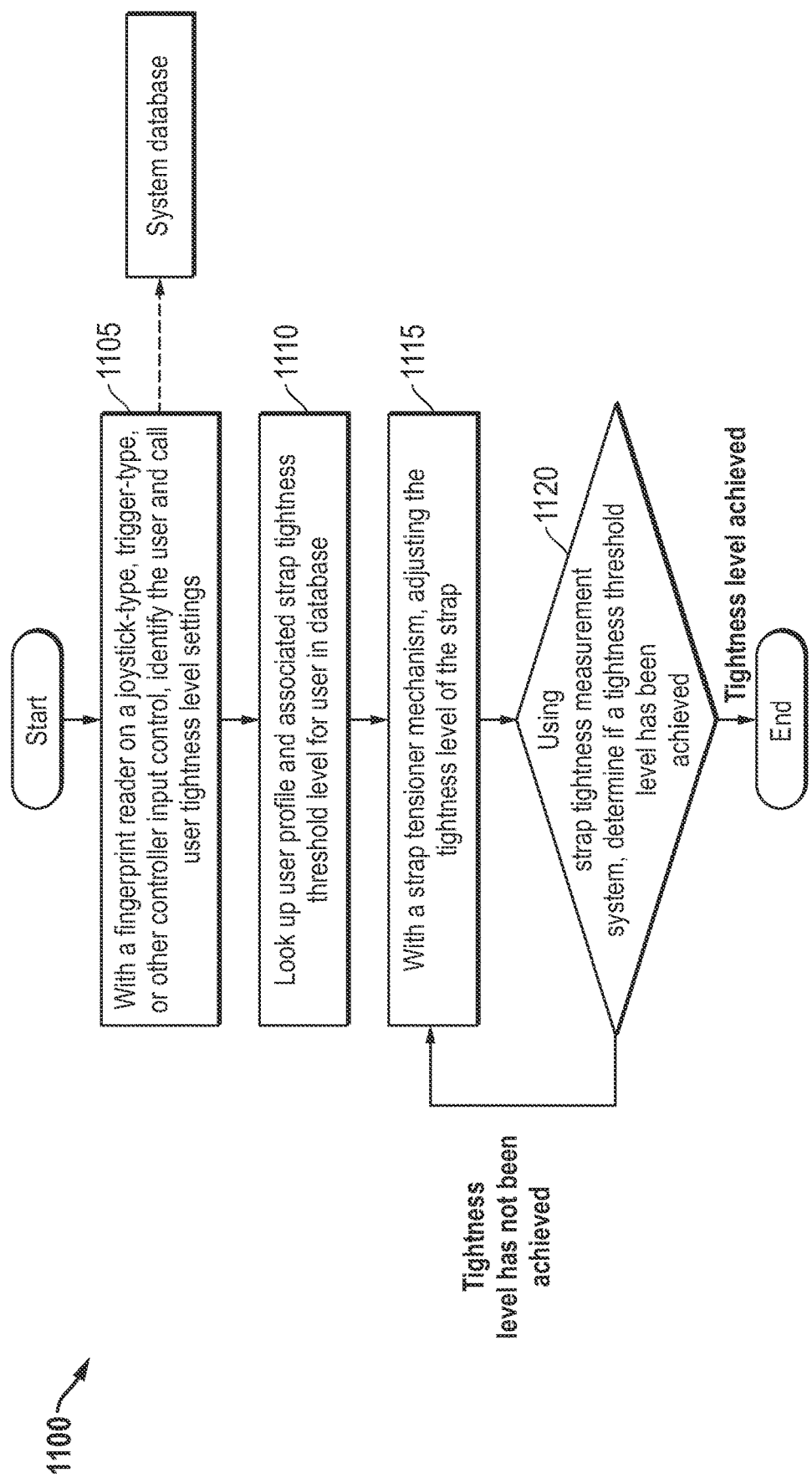
FIG. 11 is a flow diagram illustrating method of adjusting a tightness of a strap of an extended reality handheld controller according to another embodiment of the present disclosure.

FIG. 11 is a flow diagram illustrating method 1100 of adjusting a tightness of a strap of an handheld controller for use with an HMD and extended reality software application according to another embodiment of the present disclosure. In the example method 1100, a fingerprint reader may be used to identify the user prior to adjustments being made to the tightness of the strap by the strap tensioner mechanism on the handheld controller. At block 1105 of the method 1100, the user may be identified via a fingerprint reader on or integrated into, for example, a joystick-type controller input control, a trigger-type controller input control, or a button-type controller input control, and the user's predefined tightness levels may be accessed. The user may have previously selected or defined the predefined tightness threshold level via a GUI or other input which is stored with a profile associated with the user. As described herein, the fingerprint reader may help to identify the user of the handheld controller and adjust the length of a strap on the handheld controller. When the fingerprint of the user has been scanned, the head-mounted display CPU/GPU/extended reality processor or other processing resource of the HMD may access a fingerprint look-up table, cross-reference the detected fingerprint with the user's identification, and access an associated strap tightness threshold level of the strap across a user's hand. The fingerprint look-up table may be maintained on the HMD itself or may be maintained on the information handling system operatively coupled to the HMD. Further, the process for the fingerprint matching may occur on the HMD device or the information handling system. In an embodiment, the strap tightness threshold level may be set by the user prior to or during use of the handheld controller, associated in a user profile with the user identification, and may be referenced anytime the user places the user's finger on the fingerprint reader.

After the fingerprint reader has scanned the user's fingerprint, the tightness threshold level settings associated with that user may be accessed at the system database at block 1110. Again, the scanned fingerprint may be passed onto the head-mounted display CPU/GPU/extended reality processor or other processing resource or the information handling system which then may access the system database maintaining the fingerprint look-up table whether that is on the HMD or on a server or other information handling system operatively coupled to the HMD. The user-defined tightness level may then be passed onto a microcontroller within the handheld controller.

At block 1115, the method 1100 includes, with a strap tensioner mechanism, adjusting the tightness level of the strap according to the user-defined tightness threshold level found on the fingerprint look-up table. The strap tensioner mechanism may include one or more devices that tightens the strap across a user's hand until a tightness level has been achieved meeting the tightness threshold level according to various embodiments including those of the present disclosure.

The method may further include, at block 1120, determining if a tightness threshold level has been achieved using the strap tightness measurement system and strap tightness measurement system according to various embodiments herein. Again, because this tightness threshold level is user-defined, the strap tensioner mechanism may continue to tighten or loosen the strap tightness level to accomplish the correct tightness setting. Where the strap tensioner mechanism has not achieved the threshold level of tightness, the method 1100 may return to block 1115 to continue adjusting the strap to tighten or loosen the strap tightness level to meet the user's predefined tightness threshold level. Where the user-defined tightness threshold levels has/have been achieved at block 1120, the method 1100 may end.

Figure 12:
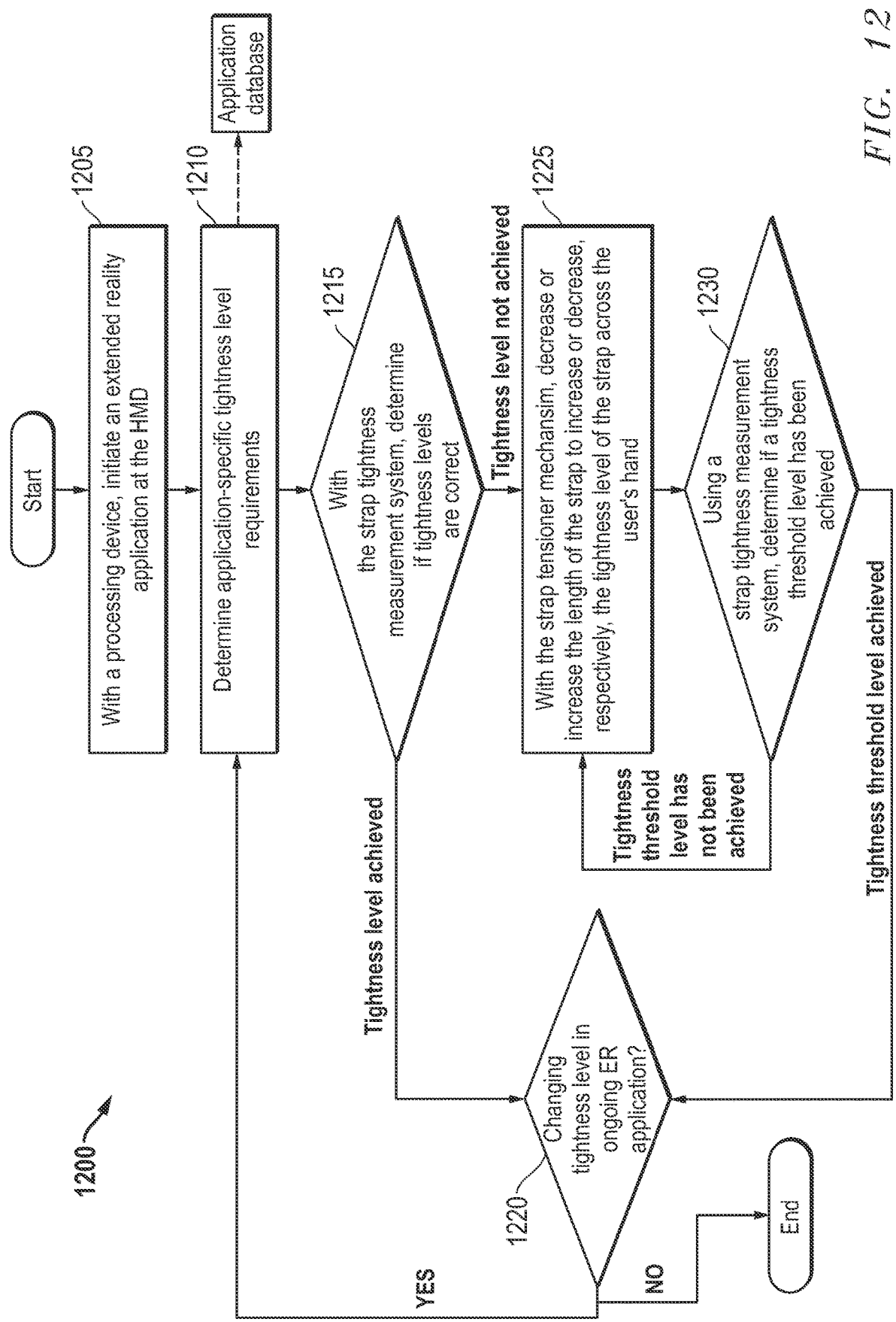
FIG. 12 is a flow diagram illustrating method of adjusting a tightness of a strap of an extended reality handheld controller according to another embodiment of the present disclosure.

FIG. 12 is a flow diagram illustrating method 1200 of adjusting a tightness of a strap of handheld controller based on an extended reality application being executed on an HMD device according to another embodiment of the present disclosure. The method 1200 may be used to adjust the tightness level of the strap of the handheld controller as the user engages with specific types of applications being executed on the HMD.

The method 1200 may include, at block 1205 with a processing device initiating an extended reality application at the HMD. The processor here may be a processing device on an information handling system operatively coupled to the HMD in an example embodiment. In another embodiment, the processing device may be a head-mounted display CPU/GPU/extended reality processor or other processing resource of the HMD.

In order to determine the tightness threshold levels associated with the extended reality application being executed, the method 1200 includes, at block 1210, a determination of an application-specific tightness level requirements. At block 1210, the head-mounted display CPU/GPU may access an application database that maintains the application-specific tightness-settings associated with each potential extended reality application that may be executed on the HMD or tightness threshold level settings intended at varying stages or portions of an executing extended reality application. This application database may be maintained on the HMD or on an information handling system operatively coupled to the HMD.

The method 1200 may then continue to block 1215 with determining if the tightness levels of the strap are correct to meet a dynamic tightness threshold level for the current extended reality application executing or current for the current stage of an extended reality application being executed using the strap tightness measurement system. In an embodiment, the strap may have been tightened on to the user's hand at, for example a user-defined tightness threshold level. This user-defined tightness threshold level may vary from the determined application-specific tightness threshold level determined at block 1210 at the application database for the detected extended reality application executing on the HMD device. For example, where the user is executing a gaming application on the HMD device, certain movements may require a tighter strap such as when the user is swinging the user's arms around or making forceful arm movements. At these points in the extended reality gaming application, the tightness threshold level may be increased so that the handheld controller is secured to the user's hand. In other parts of the execution of the gaming application (e.g., during cut-scenes, during access to a menu, etc.) the tightness threshold level may be decreased in order to make the strap against the user's hand more comfortable. Other applications, such as an art extended reality application, may have a relatively lower tightness threshold level than a gaming application in order to allow the user to have relatively more freedom of movement and because the user may not be rapidly swinging the user's arms during execution of this extended reality application. However, where the current tightness level is correct and meets the dynamic application-specific tightness level, the method 1200 may proceed to 1220 in an optional embodiment.

Where the current tightness level is not correct and does not meet the dynamic and application-specific tightness threshold level at block 1215, the method 1200 may continue with decreasing or increasing the length of the strap to increase or decrease, respectively, the tightness level of the strap across the user's hand using the strap tensioner mechanism at block 1225. Again, the strap tensioner mechanism may be any type of device that can selectively increase or decrease the length of the strap outside the housing of the handheld controller or otherwise used across a user's hand via execution of the microcontroller on the handheld controller. Various types of strap tensioner mechanisms have been described herein and any one or a combination of these types of strap tensioner mechanisms may be used.

The method 1200 may continue at block 1230 with determining if the application specific tightness threshold level has been achieved using the strap tightness measurement system of the handheld controller to measure current tightness levels. Again, various types of strap tightness measurement systems have been described in the present description and any one or a combination of these types of strap tightness measurement systems may be used to determine a tightness of the strap at any time during execution of the method 1200. Where the dynamic application-specific tightness threshold level has not been achieved, the method 1200 may return to block 1225. Where the dynamic application-specific tightness threshold level has been achieved, the method 1200 may proceed to block 1220. In an embodiment at block 1220, the method 1200 may dynamically change the tightness threshold level based on the type of extended reality application being executed on the HMD device as well as dynamically altered among phases or stages of the application as it executes in various embodiments. As described, a user may be executing a gaming extended reality application on the HMD device. In this instance, the gaming application may require the user to swing the user's arms about rapidly in order to engage within the extended reality environment. In this example embodiment, the tightness threshold level may be increased in order to better secure the handheld controller to the user's hands and to prevent damage of the handheld controller should the user lose grip on the handheld controller. Additionally, the tightness threshold level may be dynamically changed during execution of the gaming extended reality application during points in the execution where the action presented to the user does not require the user to rapidly swing the user's arms about such as during cut-scenes, when accessing a menu, or when pausing the game. At these points, the tightness threshold level may be reduced in order to provide a more comfortable fit while still helping the user by holding the handheld controller to the user's hand.

The method 1200 may be beneficial where the actions of the user engaging with the application being executed on the HMD may require the user to swing the user's arms and hands about quickly for some types of extended reality applications but not others or during some phases/stage/points of an extended application (but not other phases/stage/points). For example, where the detected application being executed on the HMD is a first-person shooter game, the head-mounted display CPU/GPU/extended reality processor or other processing resource may provide this data to the microcontroller (e.g., via Bluetooth communication) for the microcontroller to adjust the tightness (e.g., the length) of the strap across the user's hand. Because such an application may require a user to swing the user's hand about rapidly in order to engage in the extended reality presented at the HMD, the tightness level may be increased so that the handheld controller does not slip out of the user's grasp. Other applications may have an opposite effect. For example, where the head-mounted display CPU/GPU/extended reality processor or other processing resource of the HMD detects that an art program is being executed, the tightness level of the strap may be reduced to meet a lower tightness threshold level in order to allow relatively more movement of the user's hand when, for example, drawing or sculpting within the extended reality environment. In an embodiment and during execution of an application, the head-mounted display CPU/GPU/extended reality processor or other processing resource may direct the microcontroller to dynamically adjust the tightness of the strap based on changing and anticipated events where use of the handheld controller may require a change in tightness of the strap across the user's hand to a dynamically changing tightness threshold level. These anticipated events may be prevalent in the same example first-person shooter game when temporary pauses or during slow phases in the game play are anticipated. The occurrence of these anticipated events may be relayed from the processor executing the application to the head-mounted display CPU/GPU/extended reality processor or other processing resource of the HMD and from the head-mounted display CPU/GPU/extended reality processor or other processing resource to the microcontroller where the strap fit adjustment system dynamically makes those changes to the tightness of the strap as described herein and in the method 1200.

Figure 13:
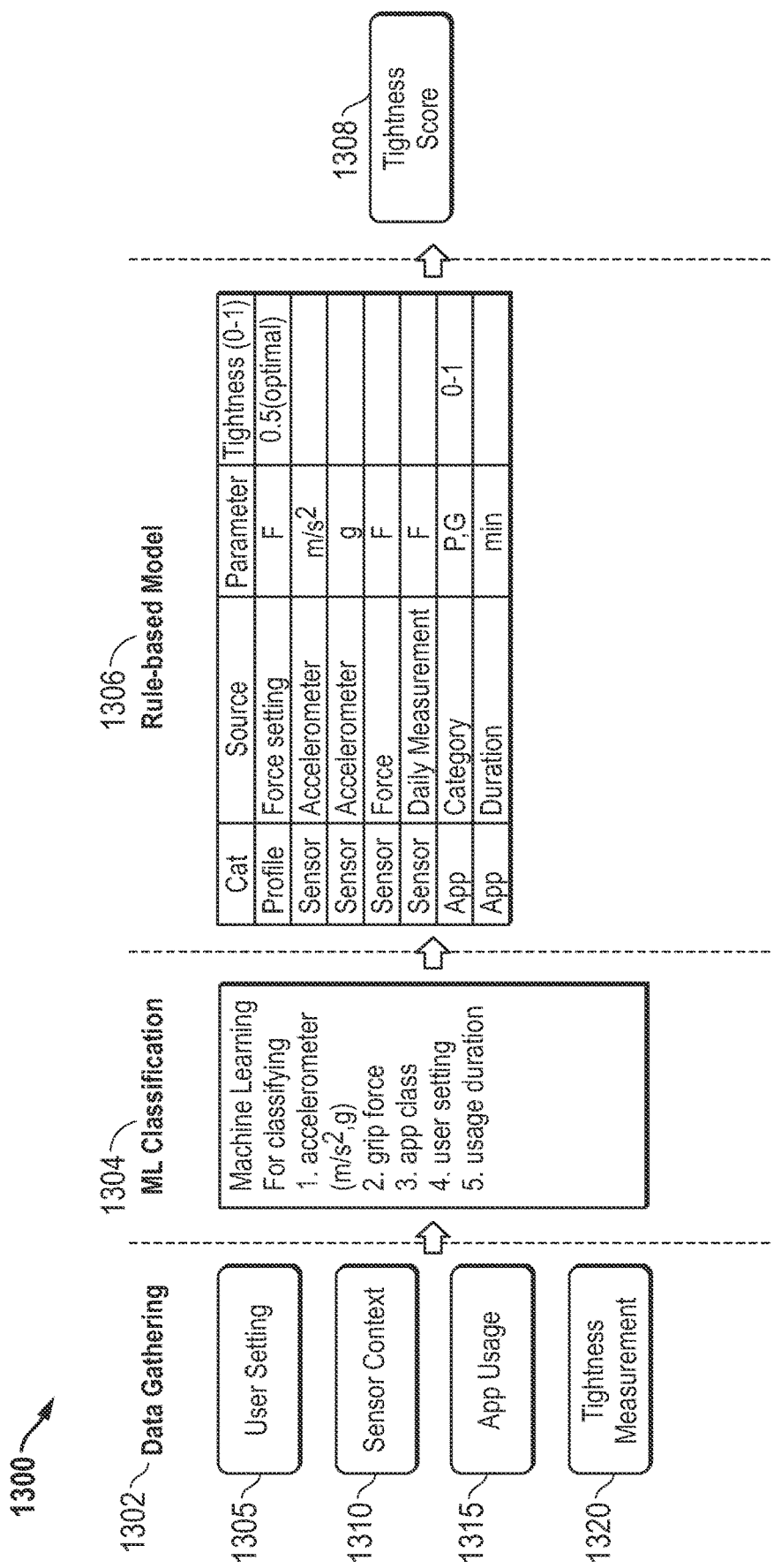
FIG. 13 is process diagram illustrating a process of generating a tightness level using a machine learning algorithm according to an embodiment of the present disclosure.

FIG. 13 is process diagram illustrating a process 1300 of generating a tightness level using a machine learning algorithm with a strap fit adjustment system according to an embodiment of the present disclosure. The present specification describes sources from which a tightness threshold level may be gathered (e.g., data gathering 1302). This process 1300 may gather various tightness level inputs from a user-defined tightness threshold level setting 1305, a sensor detected context 1310 (e.g., an accelerometer, grip sensor, fingerprint sensor, location beacons), an application-usage or stage of an extended reality application with specific tightness threshold level setting 1315, or a current tightness measurement 1320 obtained from the strap tightness measurement system, among other sources. This data gathering may be accomplished through the execution of the head-mounted display CPU/GPU/extended reality processor or other processing resource, the microcontroller in the handheld controller, or other processing device associated with the HMD or handheld controller.

In an embodiment and upon initialization of the HMD, the HMD may access a backend server or other server to receive a trained tightness level machine learning (ML) algorithm used to determine a tightness threshold level to be sued with the strap at the handheld controller. In this embodiment, therefore, the tightness level ML algorithm may be pre-trained prior to the user initializing or powering on the HMD. At this time as well, an operating system of the HMD or an information handling system associated with the HMD may gather the user-defined tightness threshold level setting 1305, the sensor detected context 1310, the application-specific tightness level setting 1315, and the current tightness measurement 1320 for input into the tightness level ML algorithm. Alternatively, the user-defined tightness threshold level setting 1305, the sensor detected context 1310, the application-specific tightness level setting 1315, and the current tightness measurement 1320 may be sent to the backend server executing the tightness level ML algorithm to be processed by the execution of the tightness level ML algorithm at that backend server. Additionally, various authentication tokens may be provided to the backend server to verify that the user is allowed access to the backend server and its services such as the execution of the tightness level ML algorithm.

As described, the user-defined tightness threshold level setting 1305, the sensor detected context 1310, the application-specific tightness level setting 1315, and the current tightness measurement 1320 may be used as input for the trained tightness level ML algorithm. In an embodiment, the tightness level ML algorithm may, in an embodiment and according to the present description, perform tasks related to providing, as output, one or more classifications indicating a rule-based model 1306 for factors used to generate a tightness score that is descriptive of the tightness level of the strap of the handheld controller across the user's hand. The ML classification process 1304 may begin, therefore, with receiving the user-defined tightness threshold level setting 1305, the sensor detected context 1310, the application-specific tightness threshold level setting 1315, and the current tightness measurement 1320 as inputs into the tightness level ML algorithm.

FIG. 13 shows several potential inputs used to train the tightness level ML algorithm or used as inputs to the tightness level ML algorithm to create the rule-based model 1306. An example input may be data from an accelerometer from the handheld device. As described herein, the accelerometer may detect movement of the handheld controller and may provide data (e.g., in meters per second per second or gravitational forces) to the tightness level ML algorithm. Another potential input may include a grip force detected by a grip force sensor within the handheld controller. The grip force may be in pounds per square inch and the grip sensor may pass this data onto a CPU/GPU/extended reality processor or other processing resource as input to the tightness level ML algorithm. Yet another potential input includes the class or type of application being executed on the HMD device. For example, application class input may define the extended reality application being a gaming application, an art application, a word processing application, or a videoconferencing application, among others. Still another input may include a user setting threshold as predefined by the user using the GUI described herein. In some instances, this GUI may allow a user to manipulate dials, slides, or input boxes or input a hand size. Still another input may include a duration of use of the handheld controller by the user. The duration of use may be detected based on a detection of the user's fingerprint during operation of the handheld device.

In an embodiment, the tightness level ML algorithm may be previously trained by receiving, as training input, user-defined tightness level setting 1305 from a variety of users of HMD devices, sensor detected context 1310 from a plurality of sensors in a plurality of handheld controllers, application-specific tightness level settings 1315 associated with a variety of applications executable on the HMD, and current tightness measurements 1320 from a plurality of handheld controllers used by a plurality of users, among other data related to the operations of the handheld controller by a plurality of users. This input may be referred to herein as input data used to either train the tightness level ML algorithm or provide input in real-time in order to receive as output indications of a tightness threshold level to be used for the strap on the handheld controller controlled by the user.

In an embodiment, the tightness level ML algorithm may use a machine learning multi-level classifier applied to the input to populate a rules-based model 1306. The tightness level ML algorithm may use any type of machine learning classifier such as Bayesian classifier, a neural network classifier, a genetic classifier, a decision tree classifier, or a regression classifier among others.

In an embodiment, the tightness level ML algorithm may be code instructions and may operate with a main memory (e.g., 104, FIG. 1), a processor (e.g., 102, FIG. 1), a video/graphic display device (e.g., 110, FIG. 1), a keyboard (e.g., 114, FIG. 1), and a network interface device (e.g., 120, FIG. 1) via bus (e.g., 108, FIG. 1), and several forms of communication may be used, including ACPI, SMBus, a 24 MHZ BFSK-coded transmission channel, or shared memory. Driver software, firmware, controllers, and the like may communicate with applications on the HMD. During this process 1300 and after the tightness level ML algorithm has been trained, a processing device of the HMD or an information handling system associated with the HMD may receive the output from the tightness level ML algorithm that defines model 1306 which can provide the dynamic tightness threshold level (e.g., tightness score 1308) that may change with usage during an extended reality application environment. A trained machine learning classifier of the tightness level ML algorithm may take inputs from the various HMD devices, sensors, and sources to classify a tightness level based on the input to generate one or more tightness threshold levels or a dynamic tightness threshold level. Upon receipt of the dataset, a processor may cause the output to be presented to the user at the video/graphic display device such as the video display of the HMD. By way of example, the output from the tightness level ML algorithm may indicate that the tightness level is to be increased to a higher tightness threshold level due to the type of application being executed at the HMD (e.g., application-specific tightness level setting 1315), accelerometer motion, and/or application usage or stage (e.g., active part of a game) and despite the current tightness measurement 1320 or user-defined tightness threshold level setting 1305. As a result, the processor may provide a message to appear on the video/graphic display device indicating to the user that the tightness level is going to be increased in one example embodiment. This indicator, in an embodiment, may include a message flashed across the display device of the HMD that may allow the user to override the changes or accept the tightness threshold level changes. The present specification contemplates that any or all these examples may be used to indicate a specific tightness level change to the user during use of the HMD. In this manner, a user may be presented with appropriate feedback from the tightness level ML algorithm that increases the user's ability to engage with the applications presented to the user via an extended reality presented at the HMD before tightness of the strap is adjusted. This may allow the user to enjoy the HMD without having to adjust the tightness levels of the strap manually after changes in use of the HMD are made. In other embodiments, the resulting dynamic tightness score changes the tightness threshold level of the handheld controller with or without notifying the user.

By way of example, the tightness level ML algorithm may receive input indicating that the user-defined tightness level setting 1305 has been set, that the sensor detected context 1310 indicates that the user has a relatively weak grip force (e.g., detected via a grip sensor in the housing of the handheld controller) and the handheld controller is currently being moved (e.g., via accelerometer in handheld controller), that the application-specific tightness threshold level setting 1315 indicates that the user will be engaged in very strenuous arm and hand swinging in an extended reality application or a stage/portion of the an extended reality application (e.g., application is a first-person shooter gaming application), and that the current tightness measurement 1320 is at a specific level. With this data, these inputs are provided to the trained tightness level ML algorithm to create a rule-based model 1306 for dynamically changing the tightness score. This rule-based module 1306 may cross-reference the current data received from the HMD and output an automated change in tightness level. In one embodiment, this tightness threshold level may or may not be accepted by the user via interaction by the user with a GUI presented on the display device of the HMD to notify a user before changing tightness. This feedback may be fled back into the machine learning algorithm. Where a user decides to not accept any changes to the current tightness threshold level settings, the user may reject the changes on the GUI. Where the user accepts those changes or fails to reject those changes within a time period, the tightness level may be increased or decreased accordingly via activation of the strap tensioner mechanism and strap tightness measurement system described herein.

In an embodiment, the input data to the tightness level ML algorithm may be continuously or routinely provided to and processed by the execution of the tightness level ML algorithm so that an appropriate tightness threshold level may be dynamically maintained. The GUI described herein may provide an option to the user regarding how often to reassess the tightness level on the handheld controller.

The blocks of the flow diagrams of FIGS. 9 through 13 or steps and aspects of the operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A handheld controller to operate with a head-mounted display (HMD) and information handling system comprising:
    a data storage device;
    the HMD having an HMD processor and an HMD display device to present to a user an extended reality image of an extended reality environment; and
    the handheld controller, including:
        a handheld controller housing to be gripped by a user's hand including a grip sensor and a strap operatively coupled to the handheld controller housing;
        a strap tensioner mechanism disposed in the handheld controller housing including a step motor and rotating wheel operatively coupled to the strap to retract the strap inside the handheld controller housing;
        a handheld controller processor executing code instructions of a strap fit adjustment system operatively coupled to the strap tensioner mechanism inside the handheld controller housing to activate the strap tensioner mechanism to tighten a strap across a user's hand until a tightness threshold level has been achieved;
        a strap tightness measurement system to measure a tightness level of the strap across a user's hand as the strap tensioner mechanism tightens the strap across the user's hand; and
    the tightness level of the strap being set to the tightness threshold level by the user and accessible from a data storage device.

2. The handheld controller of claim 1 further comprising:
    a fingerprint sensor on the handheld controller to read the user's fingerprint and determine the tightness threshold level of the strap across the user's hand by the strap fit adjustment system from a user's profile,
    wherein the tightness threshold level of the strap for the user is maintained in a memory device of the information handling system and associated with the user's sensed fingerprint.

3. The handheld controller of claim 1 further comprising:
    an application mode system to determine that a first extended reality application is being executed and adjust the tightness threshold level of the strap across the user's hand based on use characteristics of the handheld controller by the user during execution of first extended reality application.

4. The handheld controller of claim 1 further comprising:
    the strap fit adjustment system to receive input describing a type of extended reality application and selectively tighten and loosen the strap based on the type of extended reality application.

5. The handheld controller of claim 1 further comprising:
    the strap fit adjustment system to receive input describing stages of an executed extended reality application; and
    dynamically change the tightness threshold level based on anticipated use of the handheld controller during the stages of the executed extended reality application.

6. The handheld controller of claim 1 further comprising:
    strap tensioner mechanism is a spool and rachet system to pull a strap into a housing of the handheld controller according to the tightness threshold level.

7. The handheld controller of claim 1 further comprising:
    the strap tightness measurement system of the handheld controller including a strain gauge operatively coupled to an end of the strap and operatively coupled to a housing of the handheld controller to measure the tightness of the strap across a user's hand.

8. The handheld controller of claim 1 further comprising:
    the strap tightness measurement system of the handheld controller including a shape memory wire formed through the strap to measure the tightness of the strap across a user's hand based on changes in length of the shape memory wire.

9. The handheld controller of claim 1 further comprising:
    the grip sensor on the handheld controller to determine when a user's hand has gripped the handheld controller.

10. A handheld controller to operate with a head mounted display device comprising:
    the head-mounted display (HMD) to present to a user an extended reality image of an extended reality environment via at least one extended reality application;
    the handheld controller, including:
        a handheld controller housing to be gripped by a user's hand having a grip sensor and a strap operatively coupled to the handheld controller housing;
        a strap tensioner mechanism disposed in the handheld controller housing including a step motor and rotating wheel operatively coupled to the strap to retract the strap inside the handheld controller housing;

a strap fit adjustment system operatively coupled to the strap tensioner mechanism inside the handheld controller housing to activate the strap tensioner mechanism to tighten a strap across a user's hand until a tightness threshold level has been achieved; and a strap tightness measurement system to measure a tightness level of the strap across a user's hand as the strap tensioner mechanism retracts the strap into the handheld controller housing to tightens the strap across the user's hand; and the tightness level of the strap being preset to a tightness threshold level by the user and stored in memory.

11. The handheld controller of claim 10 further comprising:

a fingerprint sensor on the handheld controller to read the user's fingerprint to identify a user and determine a tightness threshold level of the strap across the user's hand by the strap fit adjustment system associated with the identified user, wherein the tightness threshold level of the strap for the user is maintained in a memory device and associated with the user's sensed fingerprint to identify the user.

12. The handheld controller of claim 10 further comprising:

an application mode system to determine that a first type of extended reality application is being executed on the HMD and adjust the tightness threshold level of the strap across the user's hand based on execution of that first type of extended reality application.

13. The handheld controller of claim 10 further comprising:

an application mode system to determine that the at least one extended reality application is being executed on the extended reality system; and the strap fit adjustment system to dynamically adjust the tightness level of the strap across the user's hand to me a dynamic tightness threshold level based on use characteristics of the handheld controller by a user during execution of one or more portions of that extended reality application.

14. The handheld controller of claim 10 further comprising:

the strap tightness measurement system of the handheld controller including a fixed strain gauge operatively coupled to an end of the strap to measure the tightness of the strap across a user's hand.

15. The handheld controller of claim 10 further comprising:

the strap tightness measurement system of the handheld controller including a shape memory wire formed through the strap to measure the tightness of the strap across a user's hand based on changes in length of the shape memory wire.

16. The handheld controller of claim 10 further comprising:

the grip sensor on the handheld controller to determine when a user's hand has gripped the handheld controller.

17. A method of adjusting a tightness of a strap of a handheld controller comprising:

detecting, with an accelerometer, when the handheld controller has been moved;

increasing, with a strap fit adjustment system, a length of the strap outside a housing of the handheld controller to allow a user's hand to pass under the strap;

detecting, with a grip sensor, the grip of the user's hand on the handheld controller;

increasing, with the strap fit adjustment system operating a strap tensions mechanism, the tightness level of the strap across the user's hand by decreasing the length of the strap outside a housing of the handheld controller; and determining, with a strap tightness measurement system, when the tightness level of the strap across the user's hand has reached a tightness threshold level.

18. The method of claim 17 further comprising:

detecting, with a fingerprint sensor on the handheld controller, a user's fingerprint of a user; and determining a tightness threshold level of the strap across the user's hand associated with the user identified by the user's fingerprint by the strap fit adjustment system, wherein the tightness threshold level of the strap for the user is maintained in a memory device and associated with the user's fingerprint.

19. The method of claim 17 further comprising:

with an application mode system, determining that an extended reality application is being executed on the extended reality system; and dynamically adjusting the tightness level of the strap across the user's hand to meet a dynamic threshold level based on use characteristics of the handheld controller by a user during execution of one or more portions of that extended reality application.

20. The method of claim 17 further comprising:

the strap tightness measurement system of the handheld controller including a strain gauge operatively coupled to an end of the strap and operatively coupled to a housing of the handheld controller to measure the tightness of the strap across a user's hand.

* * * * *